U S007577731B2

(12) United States Patent
Frey et al.

(10) Patent No.: US 7,577,731 B2
(45) Date of Patent: Aug. 18, 2009

(54) SYSTEM AND METHOD FOR MONITORING PROGRAM CODE

(75) Inventors: Gregor K. Frey, Lorsch (DE); Joerg Weller, Wieblingen (DE); Reinhold Kautzleben, Karlsruhe (DE); Miroslav R. Petrov, Sofia (BG)

(73) Assignee: SAP AG, Walldorf (DE)

( * ) Notice: Subject to any disclaimer, the term of this patent is extended or adjusted under 35 U.S.C. 154(b) by 716 days.

(21) Appl. No.: 10/748,951

(22) Filed: Dec. 30, 2003

(65) Prior Publication Data
US 2004/0194066 A1 Sep. 30, 2004

(30) Foreign Application Priority Data
Dec. 10, 2002 (JP) ............................ 2002-358313

(51) Int. Cl.
*G06F 15/173* (2006.01)
(52) U.S. Cl. ..................... 709/223; 709/224; 709/225
(58) Field of Classification Search ............... 709/223, 709/224
See application file for complete search history.

(56) References Cited

U.S. PATENT DOCUMENTS

| 5,201,044 | A | 4/1993 | Frey et al. |
| 5,944,841 | A | 8/1999 | Christie |
| 6,026,237 | A | 2/2000 | Berry et al. |
| 6,055,492 | A | 4/2000 | Alexander, III et al. |
| 6,061,721 | A | 5/2000 | Ismael et al. |
| 6,061,740 | A | 5/2000 | Ferguson et al. |
| 6,083,281 | A | 7/2000 | Diec et al. |
| 6,118,940 | A | 9/2000 | Alexander, III et al. |
| 6,134,581 | A | 10/2000 | Ismael et al. |
| 6,144,967 | A | 11/2000 | Nock |
| 6,202,199 | B1 | 3/2001 | Wygodny et al. |
| 6,205,476 | B1 | 3/2001 | Hayes |
| 6,212,520 | B1 | 4/2001 | Maruyama et al. |

(Continued)

FOREIGN PATENT DOCUMENTS

JP 2001195151 7/2001

(Continued)

OTHER PUBLICATIONS

"The Source for Developers: Core Java Java Management Extensions (JMX)", *Sun Microsystems, INC., "The Source for Developers: Core Java Java Management Extensions(JMX)"* 2 pages, http://java.sun.com/products/JavaManagement/printed_4-2-04., (Apr. 2, 2004), 2 pages.

(Continued)

*Primary Examiner*—John Follansbee
*Assistant Examiner*—Glenford Madamba
(74) *Attorney, Agent, or Firm*—Blakely, Sokoloff, Taylor & Zafman LLP

(57) ABSTRACT

A method, apparatus, and system are provided for monitoring of system resources. According to one embodiment, a monitor server may be used to monitor system resources, to collect monitoring data associated with the resources, and to provide the monitoring data to a destination. The monitor server may include a Java Management Extensions (JMX)-based monitor server. Further, a managed bean server having a registry of managed beans may be coupled with the monitor server to facilitate the monitor server to monitor the resources.

31 Claims, 11 Drawing Sheets

U.S. PATENT DOCUMENTS

| | | | |
|---|---|---|---|
| 6,230,313 B1 | 5/2001 | Callhan, II et al. |
| 6,260,187 B1 | 7/2001 | Cirne |
| 6,272,537 B1 | 8/2001 | Kekic et al. |
| 6,308,208 B1 | 10/2001 | Jung et al. |
| 6,351,776 B1 | 2/2002 | Obrien et al. |
| 6,356,931 B2 | 3/2002 | Ismael et al. |
| 6,381,735 B1 | 4/2002 | Hunt |
| 6,389,464 B1 | 5/2002 | Krishnamurthy et al. |
| 6,427,228 B1 | 7/2002 | Wigger |
| 6,466,973 B2 | 10/2002 | Jaffe |
| 6,470,388 B1 | 10/2002 | Niemi et al. |
| 6,539,501 B1 | 3/2003 | Edwards |
| 6,553,403 B1 | 4/2003 | Jarriel et al. |
| 6,567,809 B2 | 5/2003 | Santosuosso |
| 6,631,515 B1 | 10/2003 | Berstis |
| 6,658,600 B1 | 12/2003 | Hogdal et al. |
| 6,662,359 B1 | 12/2003 | Robert et al. |
| 6,664,978 B1 | 12/2003 | Kekic et al. |
| 6,681,232 B1 | 1/2004 | Sistanizadeh |
| 6,708,173 B1 | 3/2004 | Behr et al. |
| 6,738,933 B2 | 5/2004 | Fraenkel et al. |
| 6,754,890 B1 | 6/2004 | Berry et al. |
| 6,772,178 B2 | 8/2004 | Mandal et al. |
| 6,789,257 B1 | 9/2004 | MacPhail |
| 6,792,456 B1 | 9/2004 | Hellerstein et al. |
| 6,792,460 B2 | 9/2004 | Oulu et al. |
| 6,795,791 B2 | 9/2004 | Gorman |
| 6,802,067 B1 | 10/2004 | Camp et al. |
| 6,834,301 B1 | 12/2004 | Hanchett |
| 6,836,878 B1 | 12/2004 | Cuomo et al. |
| 6,851,118 B1 | 2/2005 | Ismael et al. |
| 6,853,995 B2 | 2/2005 | Matsuzaki et al. |
| 6,857,119 B1 | 2/2005 | Desai |
| 6,862,711 B1 | 3/2005 | Bahrs et al. |
| 6,880,125 B2 | 4/2005 | Fry |
| 6,895,578 B1 | 5/2005 | Kolawa et al. |
| 6,922,417 B2 | 7/2005 | Vanlint |
| 6,925,631 B2 | 8/2005 | Golden |
| 6,934,942 B1 | 8/2005 | Chilimbi |
| 6,950,874 B2 | 9/2005 | Chang et al. |
| 6,952,726 B1 | 10/2005 | White et al. |
| 6,961,918 B2 | 11/2005 | Garner et al. |
| 6,968,540 B2 | 11/2005 | Beck et al. |
| 6,985,848 B2 | 1/2006 | Swoboda et al. |
| 6,990,601 B1 | 1/2006 | Tsuneya et al. |
| 6,993,453 B2 | 1/2006 | Krissell |
| 7,000,235 B2 | 2/2006 | Mandal et al. |
| 7,017,051 B2 | 3/2006 | Patrick |
| 7,017,162 B2 | 3/2006 | Smith et al. |
| 7,024,474 B2 | 4/2006 | Clubb et al. |
| 7,051,324 B2 * | 5/2006 | Gissel et al. ................ 717/166 |
| 7,058,558 B2 | 6/2006 | Reichenthal |
| 7,062,540 B2 | 6/2006 | Reddy et al. |
| 7,069,267 B2 | 6/2006 | Spencer, Jr. |
| 7,082,464 B2 | 7/2006 | Hasan et al. |
| 7,086,065 B1 | 8/2006 | Yeluripati et al. |
| 7,093,234 B2 | 8/2006 | Jason et al. |
| 7,120,685 B2 | 10/2006 | Ullmann et al. |
| 7,131,113 B2 | 10/2006 | Chang et al. |
| 7,150,014 B2 | 12/2006 | Graupner et al. |
| 7,152,104 B2 | 12/2006 | Musante et al. |
| 7,174,370 B1 | 2/2007 | Saini et al. |
| 7,200,588 B1 | 4/2007 | Srivastava et al. |
| 7,203,868 B1 | 4/2007 | Evoy |
| 7,206,827 B2 | 4/2007 | Viswanath et al. |
| 7,209,898 B2 | 4/2007 | Pfeiffer et al. |
| 7,209,963 B2 | 4/2007 | Burton et al. |
| 7,233,989 B2 | 6/2007 | Srivastava et al. |
| 7,240,334 B1 | 7/2007 | Fluke et al. |
| 7,251,809 B2 | 7/2007 | Barclay et al. |
| 7,305,671 B2 | 12/2007 | Davidov et al. |
| 2002/0029298 A1 | 3/2002 | Wilson |
| 2002/0073063 A1 | 6/2002 | Faraj |
| 2002/0075325 A1 | 6/2002 | Allor et al. |
| 2002/0170036 A1 | 11/2002 | Jeffrey et al. |
| 2002/0186238 A1 | 12/2002 | Sylor et al. |
| 2002/0188610 A1 | 12/2002 | Spencer |
| 2003/0005173 A1 | 1/2003 | Shah et al. |
| 2003/0051102 A1 | 3/2003 | Jacobs et al. |
| 2003/0110252 A1 | 6/2003 | Yang-Huffman |
| 2003/0120593 A1 | 6/2003 | Bansal et al. |
| 2003/0167304 A1 | 9/2003 | Zhu et al. |
| 2003/0177477 A1 | 9/2003 | Fuchs |
| 2003/0225851 A1 | 12/2003 | Fanshier et al. |
| 2003/0225872 A1 | 12/2003 | Bartek et al. |
| 2003/0236880 A1 | 12/2003 | Srivastava et al. |
| 2004/0003122 A1 | 1/2004 | Melillo |
| 2004/0019662 A1 | 1/2004 | Viswanath et al. |
| 2004/0019669 A1 | 1/2004 | Viswanath et al. |
| 2004/0019684 A1 | 1/2004 | Potter et al. |
| 2004/0022237 A1 | 2/2004 | Elliott et al. |
| 2004/0028059 A1 | 2/2004 | Josyula et al. |
| 2004/0031020 A1 | 2/2004 | Berry et al. |
| 2004/0058652 A1 | 3/2004 | McGregor et al. |
| 2004/0064552 A1 | 4/2004 | Chong et al. |
| 2004/0073782 A1 | 4/2004 | Price et al. |
| 2004/0078722 A1 | 4/2004 | Pfeiffer et al. |
| 2004/0123279 A1 | 6/2004 | Boykin et al. |
| 2004/0148610 A1 | 7/2004 | Tsun et al. |
| 2004/0154011 A1 | 8/2004 | Wang et al. |
| 2004/0158837 A1 * | 8/2004 | Sengodan ................ 719/313 |
| 2004/0215649 A1 | 10/2004 | Whalen et al. |
| 2004/0230973 A1 * | 11/2004 | Cundiff et al. ................ 718/1 |
| 2004/0249613 A1 | 12/2004 | Sprogis et al. |
| 2004/0268314 A1 | 12/2004 | Kollman et al. |
| 2005/0010608 A1 | 1/2005 | Horikawa |
| 2005/0028171 A1 | 2/2005 | Kougiouris et al. |
| 2005/0033777 A1 | 2/2005 | Moraes et al. |
| 2005/0038889 A1 | 2/2005 | Frietsch |
| 2005/0039171 A1 | 2/2005 | Arra et al. |
| 2005/0039187 A1 | 2/2005 | Avakian et al. |
| 2005/0097110 A1 | 5/2005 | Nishanov et al. |
| 2005/0102536 A1 * | 5/2005 | Patrick et al. ................ 713/201 |
| 2005/0132041 A1 | 6/2005 | Kundu |
| 2005/0132337 A1 | 6/2005 | Wedel et al. |
| 2005/0172306 A1 | 8/2005 | Agarwal et al. |
| 2005/0216584 A1 | 9/2005 | Chisholm |
| 2005/0234931 A1 | 10/2005 | Yip et al. |
| 2005/0234967 A1 | 10/2005 | Draluk et al. |
| 2005/0257157 A1 | 11/2005 | Gilboa et al. |
| 2006/0095674 A1 | 5/2006 | Twomey |

FOREIGN PATENT DOCUMENTS

| | | |
|---|---|---|
| JP | 2002073522 | 3/2002 |
| JP | 2002082777 | 3/2002 |
| WO | WO 0205102 A1 | 1/2002 |
| WO | WO 0241154 A2 | 5/2002 |

OTHER PUBLICATIONS

EarlyAdopter_DS.pdf, Bibliographic Data for "Early Adopter: J2SE 1.4", *by Wrox Press* 1 pg.

"U.S. Appl. No. 10/813,788 Final Office Action Mailed Nov. 26, 2007 for 6570P067",(Nov. 26, 2007), Whole Document.

"U.S. Appl. No. 11/026617 Final Office Action Mailed Nov. 20, 2007 for 6570P184", (Nov. 20, 2007).

"6570P027 OA mailed Jan. 18, 2008 for U.S. Appl.No. 10/814,907", (Jan. 18, 2008), Whole Document.

"6570P033 OA Mailed Feb. 21, 2008 for U.S. Appl. No. 10/815,018".

(Feb. 21, 2008), Whole Document.

"6570P045 FOA mailed Jun. 8, 2007 for U.S. Appl. No. 10/748,779", (Jun. 8, 2007), Whole Document.

"6570P045 OA mailed Dec. 19, 2007 for U.S. Appl. No. 10/748,779", (Dec. 19, 2007), Whole Document.
"6570P045 OA mailed Dec. 29, 2009 for U.S. Appl. No. 10/748,779", (Dec. 29, 2006), Whole Document.
"6570P045 OA mailed Jun. 29, 2006 for U.S. Appl. No. 10/748,779", (Jun. 29, 2006), Whole Document.
"6570P053 OA Mailed Jan. 24, 2008 for U.S. Appl. No. 10/813,999", (Jan. 24, 2008), Whole Document.
"6570P067 FOA mailed Jul. 2, 2007 for U.S. Appl. No. 10/813,788", (Jul. 2, 2007), Whole Document.
"6570P067 OA mailed Jan. 25, 2007 for U.S. Appl. No. 10/813,788", (Jan. 25, 2007), Whole Document.
"Adding Systems to the Availability Monitoring Manually", http://help.sap.com/saphelp_erp2004/helpdata/en/38/9e0fe5d7980fffe10000009b3810a5/c . . . , Adding Systems to the Availabilty Monitoring Manually (SAP Library -The Alert Monitoring), (Downloaded Dec. 14, 2004), Whole Document.
"Alert Monitoring of the J2EE Engine Using CCMS", http://help.sap.com/saphelp_webas630/helpdata/en/92/ef30241c0f4a41959390a27e286ce . . . Alert Monitoring of the J2EE Engine Using CCMS - SAP Library, (Downloaded Dec. 14, 2004), Whole Document.
"Availability and Performance Overview Monitor", http://help.sap.com/saphelp_erp2004/helpdata/en/ae/cd823bd26a5c42e10000000a114084 . . . Availability and Performance Overview Monitor (SAP Library - The Alert Monitor), (Downloaded Dec. 14, 2004), Whole Document.
"Availability Monitoring with CCMSPING", http://help.sap.com/saphelp_erp2004/helpdata/en/38/9e3337d7840ffee10000009b3810a5/ . . . Availability Monitoring with CCMSPING (SAP Library - The Alert Monitor), (Downloaded Dec. 14, 2004), Whole Document.
"CCMS Agents", http://help.sap.com/saphelp_nw04/helpdata/en/48/6a76607a7c91409474ad6c7b6f5a26/frameset.htm, Whole Document.
"CCMS Monitoring Architecture: Preconfigured Monitors for the Alert Monitor", *SAP Web Application Server 6.20*, (Nov. 16, 2001), Whole Document.
"CCMS: Informix", http://help.sap.com/saphelp_erp2004/helpdata/en/73/61c850800e25478d24696196a969a5 . . . , CCMS: Informix (SAP Library - CCMS: Informix), (Downloaded Dec. 14, 2004), Whole Document.
"Changing Monitoring Setting of Servers and Groups", http://help.sap.com/saphelp_erp2004/helpdata/en/6c/d667aa73bb9c428e9786eaf559f7ea/ . . . , Changing Monitoring Setting of Servers and Groups (SAP Library - The Alert Monitor), (Downloaded Dec. 14, 2004), Whole Document.
"Confirguring Availability Monitoring", http://help.sap.com/saphelp_erp2004/helpdata/en/38.9e100dd7980fffe10000009b3810a5/ . . . Configuring Availability Monitoring (Sap Library - the Alert Monitor), (Downloaded Dec. 14, 2004), Whole Document.
"Creating and Changing a Monitoring Pause", http://help.sap.com/saphelp_erp2004/helpdata/en/73/098488227c384f97c564225737108c . . . , Creating and Changing a Monitoring Pause (SAP Library - The Alert Monitor), (Downloaded Dec. 14, 2004), Whole Document.
"Creating and Changing Monitoring Rules", http://help.sap.com/saphelp_erp2004/helpdata/en/40/17fd8c1754324b81da9027f1bdbb75/ . . . , Creating and Changing Monitoring Rules (SAP Library - The Alert Monitor), (Downloaded Dec. 14, 2004), Whole Document.
"Debugging J2EE Applications", *Sun Microsystems, Java - J2EE 1.4 Application Server Developer's Guide, "Debugging J2EE Applications" Chapter 4,* http://java.sun.com/j2ee/1.4 docs/devguide/dgdebug,html, 2003, printed Jul. 2, 2004 (11 pgs.), (2003), 11 pgs.
"How Introscope Works", *Wily Technology, Inc., Wily Solutions "How Introscope Works" - Enterprise Application Mangement,* http://wilytech.com/solutions/products/howWorks.html, 1999-2004, printed Jul. 2, 2004 (1 page)., (1999-2004), 1 page.
"Installing and Registering CCMS Agents", http://help.sap.com/saphelp_nw04/helpdata/en/48/6a76607a7c91409474ad6c7b6f5a26/frameset.htm, SAP Library, (Downloaded Dec. 14, 2004), Whole Document.
"Installing Availabilty Agent CCMSPING", http://help.sap.com/saphelp_erp2004/helpdate/en/79/498e3bae1d9e7ae10000000a114084 . . . , Installing Availabilty Agent CCMSPING (SAP Library - The Alert Monitor), (Downloaded Dec. 14, 2004), Whole Document.
"Java Logging Overview", (Nov. 2001), pp. 1-9.
"Jikes Bytecode Toolkit: Overview" *Alphaworks*, www.alphaworks.ibm.com/tech/jikesbt, posted Mar. 31, 2000, 2 pages, printed Sep. 28, 2006.
"Mobile-Code Security Mechanisms for Jini", *Mobile-Code Security Mechanisms for Jini - "Mobile-Code Security Mechanisms for Jini" Downloaded code, DISCEX 2001 Paper,* http://theory.stanford.edu/people/jcm/software/jinifilter.html, printed Jul. 2, 2004 - (3 pgs.), (2001), 3 pgs.
"Monitoring".
http://help.sap.com/saphelp_webas630/helpdata/en/68/f4bc3deaf28d33e10000000a1 1405 . . . , Monitoring (SAP Library - J2EE Technology in SAP Web Application Server), (Downloaded Dec. 14, 2004), Whole Document.
"Operating System Monitor", http://help.sap.com/saphelpnw04/helpdata/en/55/b5b93b5bb3493fe10000000a114084/frameset.htm, SAP Library , (Downloaded Dec. 14, 2004), Whole Document.
"Package Gnu.Bytecode", *Package Gnu.Byetcode,* http://sources.redhat.com/kawa/api.gnu/bytecode/package-summary.html, 4 pages, printed Sep. 28, 2006.
"The Alert Monitor", http://help.sap.com/saphelp_nw2004s/helpdata/en/28/83493b6b82e908e10000000a11402f/content.htm, SAP Library, (Downloaded Dec. 14, 2004), Whole Document.
"The Java Object Instrumentation Environment", *Duke University,* www.cs.duke.edu/ari/joie/, last update May 2003, printed Sep. 28, 2006, 2 pages.
"The Monitoring Architecture: Concept", http://help.sap.com/saphelp_nw04/helpdata/en/c4/3a7da1505211d189550000e829fbbd/frameset.htm, SAP Library, (Downloaded Feb. 27, 2008), Whole Document.
"The SAP J2EE Engine Monitoring Architecture", http://help.sap.com/saphelp_webas630/helpdata/en/83/6b20165833fa43b28f0349a4d3108 . . . , The SAP J2EE Engine Monitoring Architecture (SAP Library - J2EE Technology in SAP . . . , (Downloaded Dec. 14, 2004), Whole Document.
"The Wily 5 Solution - Enterprise Aplications are Your Business", *Wily Technology, Inc., Wily Technology, Inc., Wily Solutions "The Wily 5 Solution - Enterprise Aplications are Your Business",* http://www.wilytech.com/solutions/ibm_family.html, 1999-2004, printed Jul. 2, 2004 (2 pgs.), (1999-2004), 2 pgs.
"Wily Introscope", *Wily Technology, Inc., Wily Solutions "Wily Introscope" - Enterprise Application Management,* http://www.wilytech.com/solutions/products/Introscope.html, 1999-2004, printed Jul. 2, 2004 (2 pgs.), (1999-2004), 2 pgs.
Affeldt, Reynald, et al., "Supporting Objects in Run-Time Bytecode Specialization", *Reynald Affeldt, et al., "Supporting Objects in Run-Time Bytecode Specialization", Department of Graphics and Computer Science, University of Tokyo, ASIA-PEPM '02, Sep. 12-17, 2002,* ACM, pp. 50-60., (Sep. 12-17, 2002), 50-60.
Burtscher, et al., "Automatic Generation of High-Performance Trace Compressors", *IEEE,* (2005), pp. 1-12.
Burtscher, M, "VPC3: A Fast and Effective Trace-Compression Algorithm", *ACM,* (2004), pp. 167-176.
Chander, Ajay, et al., "Mobile Code Security by Java Bytecode Instrumentation", Ajay Chander et al., "Mobile Code Security by Java Bytecode Instrumentation".
Proceedings of the Darpa Information Survivability Conference & Exposition DISCEX-II 2001, Jun. 12-14, 2001, Stanford University and University of Pennsylvania, * Partially suppo, (Jun. 12-14, 2001), 14 pgs.
Chang, L. , et al., "A Network Status Monitoring System Using Personal Computer", Chang, L.; Chan, W.-L.; Chanq, J.; Ting, P.: Netrakanti, M., "A Network Status Monitoring System Using Personal Computer", Global Telecommunications Conference, 1989, and Exhibition. 'Communications Technology for the 1990s and Beyond'. GLOBECOM '89., IEEE, (1989), pp. 201-206.

Cohen, Geoff A., et al., "An Architecture for Safe Bytecode Insertion", Geoff A. Cohen, et al., Software-Practice and Experience, [Version: Mar. 6, 2000 v2.1] "An Architecture for Safe Bytecode Insertion", Department of Computer Science, Duke University (27 pgs.), (Mar. 6, 2000), 27 pgs.

Cohen, Geoff A., et al., "Automatic Program Tranformation with JOIE", *Paper, .Departmen of Computer Science, Duke University*, 12 pages.

Dahm, Markus , "Welcome to the Byte Code Engineering Library 4.4.1", http://bcel.sourceforoe.net/main.html, last updated Apr. 12, 2002, 2 pages, printed Sep. 28, 2006.

Davies, Jonathan, et al., "An Aspect Oriented Performance Analysis Environment", Jonathan Davies, et al., Proceedings of the 2nd international conference on "An Aspect Oriented Performance Analysis Environment", 10 pgs., 2003, Boston, Massachusetts Mar. 17-21, 2003, (Mar. 17-21, 2003), 10 pgs.

Gagnon, Etienne , et al., "Effective Inline-Threaded Interpretation of Java Bytecode Using Preparation Sequences", Etienne Gagnon, et al., "Effective Inline-Threaded Interpretation of Java Bytecode Using Preparation Sequences", Sable Research Group, Universite du Quebec a Montreal and McGill University, Montreal. Canida, Jan. 23 2003 (15 pgs.)., (Jan. 2003), 15 pgs.

Gill, Peter W., "Probing for a Continued Validation Prototype", Peter W. Gill, "Probing for a Continued Validation Prototype", a Thesis Submitted to the Faculty of the Worcester Polytechnic Institute, May 2001, (111 pages), (May 2001), 111 pages.

Goldberg, Allen , et al., "Instrumentation of Java Bytecode for Runtime Analysis", Allen Goldberg, et al., "Instrumentation of Java Bytecode for Runtime Analysis", Fifth ECOOP Workshop on Formal Techniques for Java-like Programs, Jul. 21, 2003, Kestrel Technology, NASA Ames Research Center, Moffett Field, California USA, (9 pgs.)., (Jul. 21, 2003), 9 pgs.

Hampton, Kip, "High-Performance XML Parsing with SAX", Published on XML.com by Feb. 14, 2001.

Hart, James, "Early Adopter: J2SE 1.4", chapter 5, Wrox Press, (Sep. 2001), pp. 1-12.

Kaplan, et al., "Flexible Reference Trace Reduction for Vm Simulations", ACM, (2003), pp. 1-38.

Keller, Ralph , et al., "Supporting the Integration and Evolution of Components Through Binary Component Adaptation", www.cs.ucsb.edu/oocsb, Sep. 9, 1997, Technical Report TRCS97-15 12 pages.

Lee, Han B., "BIT: Bytecode Instrumenting Tool", University of Colorado, Department of Computer Science 1997, 51 pages.

Lee, Han B., et al., "BIT: A Tool for Instrumenting Java Bytecodes", Han Bok Lee, et al., "BIT: A Tool for Instrumenting Java Bytecodes", originally published in the Proceedings of the USENIX Symposium on Internet Technologies and Systems, Monterey, California, Dec. 1997, www.usenix.orq/ (11 pgs.)., (Dec. 1997), 11 pgs.

Li, Wen , et al., "Collaboration Transparency in the Disciple Framework", Wen Li et al., "Collaboration Transparency in the Disciple Framework", CAIP Center, Rutgers - The State University of New Jersey, Piscataway, NJ, USA, Proceeding of the ACM International Conference on Supporting Gruop Work (Group '99) Nov. 14-17, 1999, (Nov. 14-17, 1999), 10 pgs.

Macrides, Nathan, "SANS Security Essentials (GSEC) Practical Assignment Version 1.4", Nathan Macrides, Security Techniques for Mobile Code "SANS Security Essentials (GSEC) Practical Assignment Version 1.4", Jul. 11, 2002, (11 pgs.), (Jul. 11, 2002), 11 pgs.

Mclaughlin, Brett , "Tip: Set up a SAX Parser", Published by International Business Machines Corporation on Jul. 2, 2003.

Mcnamee, Dylan , et al., "Specialization Tools and Techniques for Systematic Optimization of System Software" Dylan McNamee, et al., "Specialization Tools and Techniques for Systematic Optimization of System Software", Oregon Graduate Institute of Science & Technology, and University of Rennes/IRISA, ACM Transactions on Computer Systems, 2001 (30 pqs.), (2001), 30 pgs.

Nikolov, Nikolai , "Classfile Conversion Into An Organization of Objects, and Modification Thereof, To Effect Bytecode Modification", Nikolov, Nikolai,. "Classfile Conversion Into An Organization of Objects, and Modification Thereof, To Effect Bytecode Modification", U.S. Appl. No. 10/750,396, Office Action mailed. Sep. 5, 2006. the Offie Action, claims as they stood in the app.

Nikolov, Nikolai , "Execution of Modified Byte Code for Debugging, Testing and/or Monitoring of Object Oriented Software", Nikolai Nikolov, "Execution of Modified Byte Code for Debugging, Testing And/Or Monitoring of Object Oriented. Software", U.S. Appl. No.10/749,617, filed on Dec. 30, 2003, Ofice Action mailed Aug. 23, 2006. the Office Action claims as they sto.

Office Action May 30, 2008, Office Action mailed May 30, 2008 for Pending U.S. Appl. No. 10/749,733.

Ploesh, Reinhold , "Evaluation of Assertion Support for the Java Programming Language", Reinhold Ploesh Johannes Kepler University Linz, Austria.

"Evaluation of Assertion Support for the Java Programming Language", JOT: Journal of Object Technology, vol. 1, No. 3, Special Issue: Tools USA 2002 Proceedings, pp. 5-17, http://www.jot.fm/issues/, (2002), 5-17.

Rudys, Algis , et al., "Enforcing Java Run-Time Properties Using Bytecode Rewriting", Algis Rudys, et al., "Enforcing Java Run-Time Properties Using Bytecode Rewriting", International Symposium on Software Security (Tokyo, Japan), Nov. 2002, Rice University, Houston, TX 77005, USA (16 pgs.)., (Nov. 2002), 16 pgs.

Snyder, Alan, "The Essence of Objects: Concepts and Terms", IEEE Software, Jan. 1993, pp. 31-42, Sunsoft, Mountain View.

Stephenson, Ben , et al., "Characterization and Optimization of Java Application's", Ben Stephenson, et al., "Characterization and Optimization of Java Applications" Department of Computer Science, Abstract in Western Research Forum Program & Abstracts, p. 20, 2003., (2003), p. 20.

USPTO, Non-Final Office Action for U.S. Appl. No. 10/813,788 mailed Jul. 31, 2008.

USPTO, "6570P184 OA Mailed May 21, 2008 for U.S. Appl. No. 11/026,617", (May 21, 2008), Whole Document.

Welch, Ian , et al., "Kava - A Reflective Java Based on Bytecode Rewriting", Ian. Welch, et. al., "Kava - A Reflective Java Based on Bytecode Rewriting" SpringerLink - Verlag Berling Heidelberg 2000, Chapter, Lectures Notes in Computer Science, W. Cazzola, et al. Editors, Reflection and Software Engineering, LNCS, pp. 155-167., (2000), 155-167.

Wu, et al., "From Trace Generation to Visualization: A Performance Framework for Distributed Parallel Systems", IEEE (2000), pp. 1-18.

* cited by examiner

SYSTEM AND METHOD FOR MONITORING PROGRAM CODE

BACKGROUND OF THE INVENTION

1. Field of the Invention

Embodiments of this invention generally relate to system resource monitoring and more particularly, to resource monitoring using Java Management Extensions (JMX)-based Java monitoring architecture.

2. Description of Related Art

In many modern computing systems and networks (systems), monitoring of system resources and components of significant importance to ensure not only the reliability and security of information flow, but also to promptly detect system deficiencies so that they are corrected in a timely manner. Typically, conventional client-server monitoring systems or architectures are used to perform monitoring of the resources.

FIG. 1 is a block diagram illustrating a conventional prior art monitoring system. As illustrated, typically, a conventional monitoring system (conventional system) 100 includes a monitor server 102 coupled with a client 104 and a data storage medium (storage) 110. The monitor server 102 monitors system resources (resources) 106-108 for the client 104. The monitor server 102 monitors the resources 106-108 in response to a request for monitoring received from the client 104. Typically, the storage 110 is used to store the monitoring data or information gathered by the monitoring server 102 from monitoring of the resources 106-108, and the monitoring data is then reported to the client 104.

Conventional monitoring systems, however, do not provide adequate monitoring of the resources, as they are limited in performance because of, for example, architectural limitations, inflexibility in levels of monitoring, lack of convenience in viewing the monitoring data, low level programming interface, and having the resources shared by all the software running on the system including virtual machines.

SUMMARY OF THE INVENTION

A method, apparatus, and system are provided for monitoring of system resources. According to one embodiment, a monitor server may be used to monitor system resources, to collect monitoring data associated with the resources, and to provide the monitoring data to a destination. The monitor server may include a Java Management Extensions (JMX)-based monitor server. Further, a managed bean server having a registry of managed beans may be coupled with the monitor server to facilitate the monitor server to monitor the resources.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
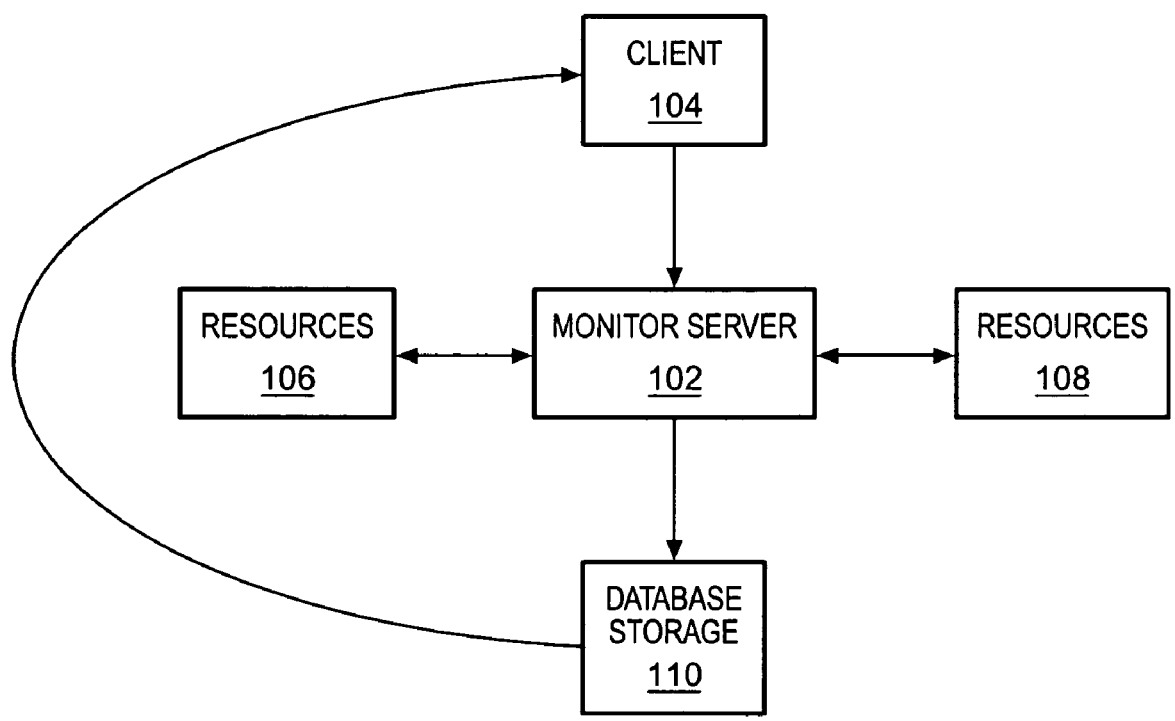
FIG. 1 is a block diagram illustrating a conventional prior art monitoring system.

A method, apparatus, and system are provided for monitoring of system resources. According to one embodiment, a monitor server may be used to monitor system resources, to collect monitoring data associated with the resources, and to provide the monitoring data to a destination. The monitor server may include a Java Management Extensions (JMX)-based monitor server. Further, a managed bean server having a registry of managed beans may be coupled with the monitor server to facilitate the monitor server to monitor the resources. The resources may include, for example, Java resources associated with a Java 2 Platform, Enterprise Edition ("J2EE") engine. However, the underlying principles of the invention are not limited to any particular programming standard or application server architecture.

According to one embodiment, the destination may include a computing center management system ("CCMS"), a well-known management and monitoring architecture designed by SAP AG for use in R/3 systems. Additional and/or alternate destinations may include administrative tools/viewers, standard Web browsers, and third party tools/viewers. The destination may be used to originate a request for the monitor server to perform the monitoring of the resources, and to receive the monitoring data resulting from the monitoring of the resources. The monitoring data may be displayed at its destination (e.g., using a monitor viewer from the administrative tools).

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
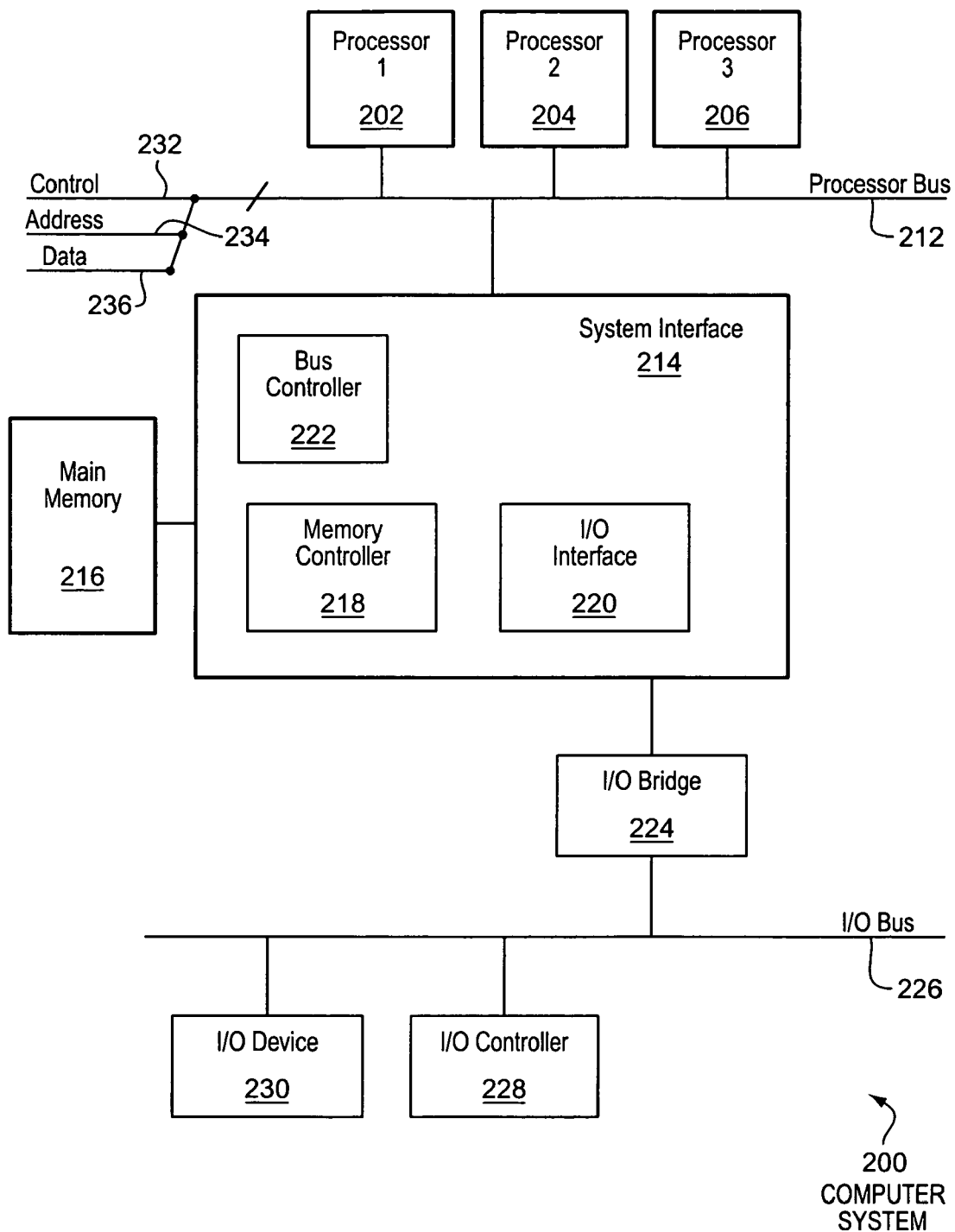
FIG. 2 is a block diagram illustrating an embodiment of a computer system.

FIG. 2 is a block diagram illustrating an embodiment of a computer system. The computer system (system) includes one or more processors 202-206 including one or more microprocessors, microcontrollers, field programmable gate arrays (FPGA), application specific integrated circuits (ASIC), central processing units (CPU), programmable logic devices (PLD), and similar devices that access instructions from system storage (e.g., main memory 216), decode them, and execute those instructions by performing arithmetic and logical operations.

The processor bus 212, also known as the host bus or the front side bus, may be used to couple the processors 202-206 with the system interface 214. The processor bus 212 may include a control bus 232, an address bus 234, and a data bus 236. The control bus 232, the address bus 234, and the data bus 236 may be multidrop bidirectional buses, e.g., connected to three or more bus agents, as opposed to a point-to-point bus, which may be connected only between two bus agents.

The system interface 214 may be connected to the processor bus 212 to interface other components of the system 200 with the processor bus 212. For example, system interface 214 may includes a memory controller 218 for interfacing a main memory 216 with the processor bus 212. The main memory 216 typically includes one or more memory cards and a control circuit (not shown). System interface 214 may also include an input/output (I/O) interface 220 to interface the I/O bridge 224 with the processor bus 212. The I/O bridge 224 may operate as a bus bridge to interface between the system interface 214 and an I/O bus 226. One or more I/O controllers 228 and I/O devices 230 may be connected with the I/O bus 226, as illustrated. I/O bus 226 may include a peripheral component interconnect (PCI) bus or other type of I/O bus.

The system 200 may include a dynamic storage device, referred to as main memory 216, or a random access memory (RAM) or other devices coupled to the processor bus 212 for storing information and instructions to be executed by the processors 202-206. The main memory 216 also may be used for storing temporary variables or other intermediate information during execution of instructions by the processors 202-206. System 200 may include a read only memory (ROM) and/or other static storage device coupled to the processor bus 212 for storing static information and instructions for the processors 202-206.

The main memory 216 may include a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. The main memory 216 may also include one or more hard disks, floppy disks, ZIP disks, compact disks (e.g., CD-ROM), digital versatile/video disks (DVD), magnetic random access memory (MRAM) devices, and other system-readable media that store instructions and/or data. The main memory 216 may store program modules such as routines, programs, objects, images, data structures, program data, and other program modules that perform particular tasks or implement particular abstract data types that facilitate system use.

The I/O device 230 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. The I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

The system 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of system 200 will vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 3:
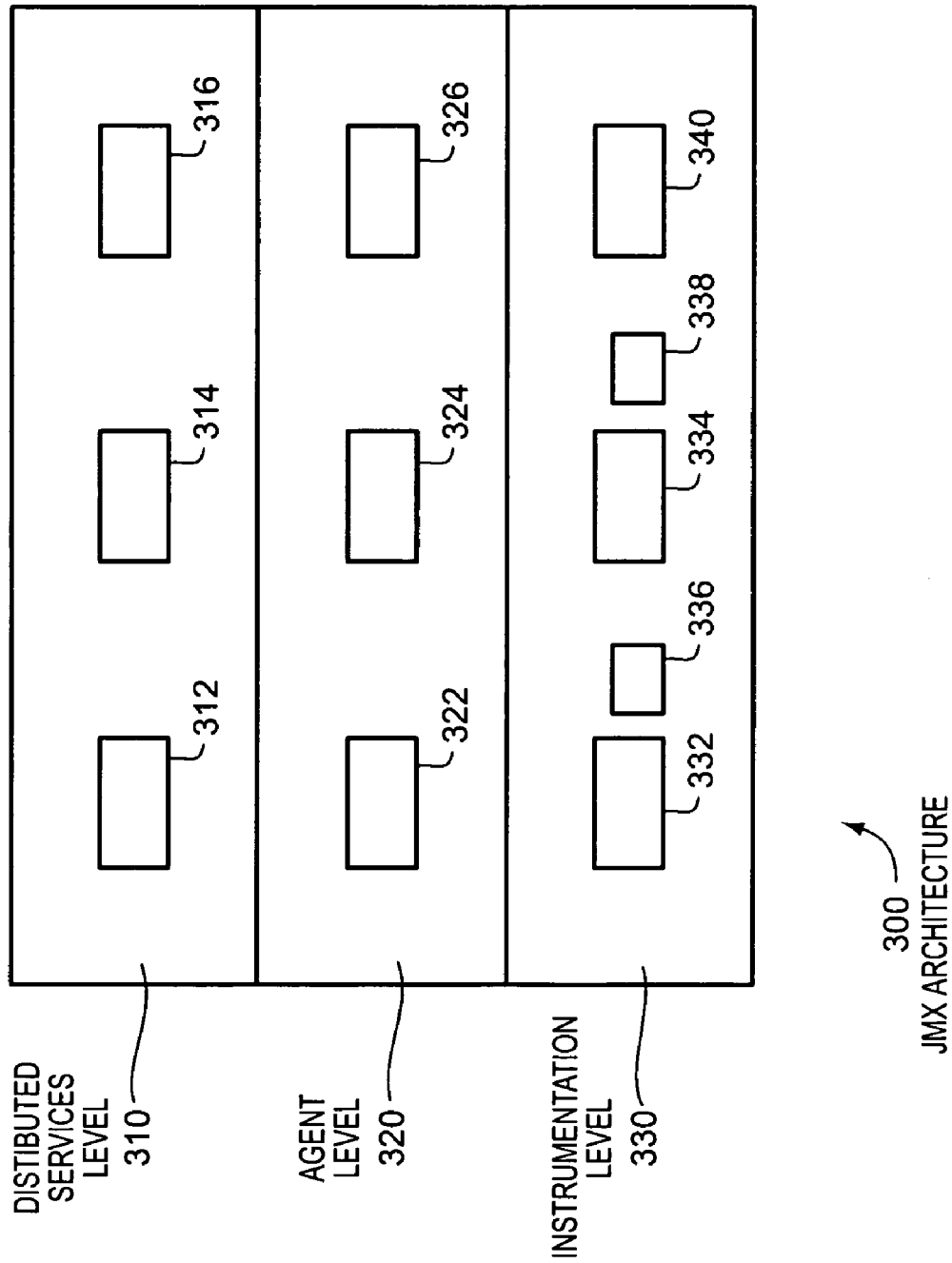
FIG. 3 is a block diagram illustrating an embodiment of Java Management Extensions architecture.

FIG. 3 is a block diagram illustrating an embodiment of Java Management Extensions architecture. The illustrated embodiment of Java Management Extensions ("JMX") architecture 300 includes three layers or levels 310, 320, 330. According to one embodiment, the three levels 310, 320, 330 may include a distributed services level (or manager or user or client level) 310, an agent level (or application level) 320, and an instrumentation level (or database level) 330. Some or all of the elements at each of levels of the JMX architecture 300 may be, directly or indirectly, interconnected via a network (e.g., a Local Area Network ("LAN")). Alternative embodiments of the JMX architecture 300 may include more or fewer levels.

The distributed services level 310 may serve as an interface between the JMX architecture 300 and one or more users or clients. As illustrated, the distributed services level 310 may include one or more user terminals 312-314. One or more of the user terminals 312-314 to collect and gather user input and send it to the agent level 320 over a network connection. Network connection may be a wired or wireless connection to a Local Area Network (LAN), a Wide Area Network (WAN), a Metropolitan Area Network (MAN), an intranet, and/or the Internet. Distributed services level terminals 312-314 may include personal computers, notebook computers, personal digital assistants, telephones, and the like. According to one embodiment in which network connection may connect to the Internet, one or more of the user terminals 312-314 may include a Web browser (e.g., Internet Explorer or Netscape Navigator) to interface with the Internet.

According to one embodiment, the distributed services level 310 may also include management applications 316, such as a JMX-compliant management application, a JMX manager, and/or a proprietary management application. The management applications 316 may also include one or more graphical management applications, such as a visual administrator, operating to, for example, retrieve and display information received from the agent level 320 and/or the instrumentation level 330.

The visual administrator may include a monitor viewer to display such information. Management applications 316 may also include third party tools including a file system to store the information and may also include a Graphical User Interface ("GUI")-based monitor viewer to display the information. The distributed services level 310 may also include the CCMS system described above.

The agent level 320 may include one or more application servers 322-326. An application server may refer to a computing device that performs data processing. The agent level 320 may also include a computing device (e.g., a dispatcher) to perform load balancing among application servers 322-326. According to one embodiment in which the agent level 320 exchanges information with the distributed services level 310 via the Internet, one or more of the application servers 322-326 may include a Web application server. According to one embodiment, the application servers 322-326 may be implemented according to the Java 2 Enterprise Edition Specification v1.4, published on Jul. 12, 2002 ("the J2EE Standard").

The applications servers 322-326 may include one or more dedicated Java Managed Bean ("MBean") servers having agent services. According to one embodiment, for and at each Java virtual machine ("JVM") with managed resources, there may be one or more agents operating at the agent level 320. The one or more agents may include the one or more MBean servers, agent services, a set of MBeans, one or more connectors, and/or one or more protocol adaptors. An MBean Server may include a registry for MBeans and act as a single entry point for calling MBeans in a uniform fashion from management applications at other JVMs.

The instrumentation level 330 may provide a data storage medium for the JMX architecture 300. As illustrated, according to one embodiment, the instrumentation level 330 may include one or more database management systems ("DBMS") 332-334 and data sources 336-338. According to one embodiment, the data sources 336-338 may include databases and/or other systems capable of providing a data store.

Furthermore, according to one embodiment, the instrumentation level 330 may include one or more hosts including one or more resources having MBeans, such as instrumentation MBeans. The instrumentation level 330 may make Java objects available to management applications 316. The Java objects instrumented according to the JMX-standard may include MBeans. According to one embodiment, the resources represented by MBeans may include managed resources 340. The managed resources 340 may include a kernel, a server component, or the like. MBeans may expose a management interface including constructors, attributes, operations, and notifications.

Figure 4:
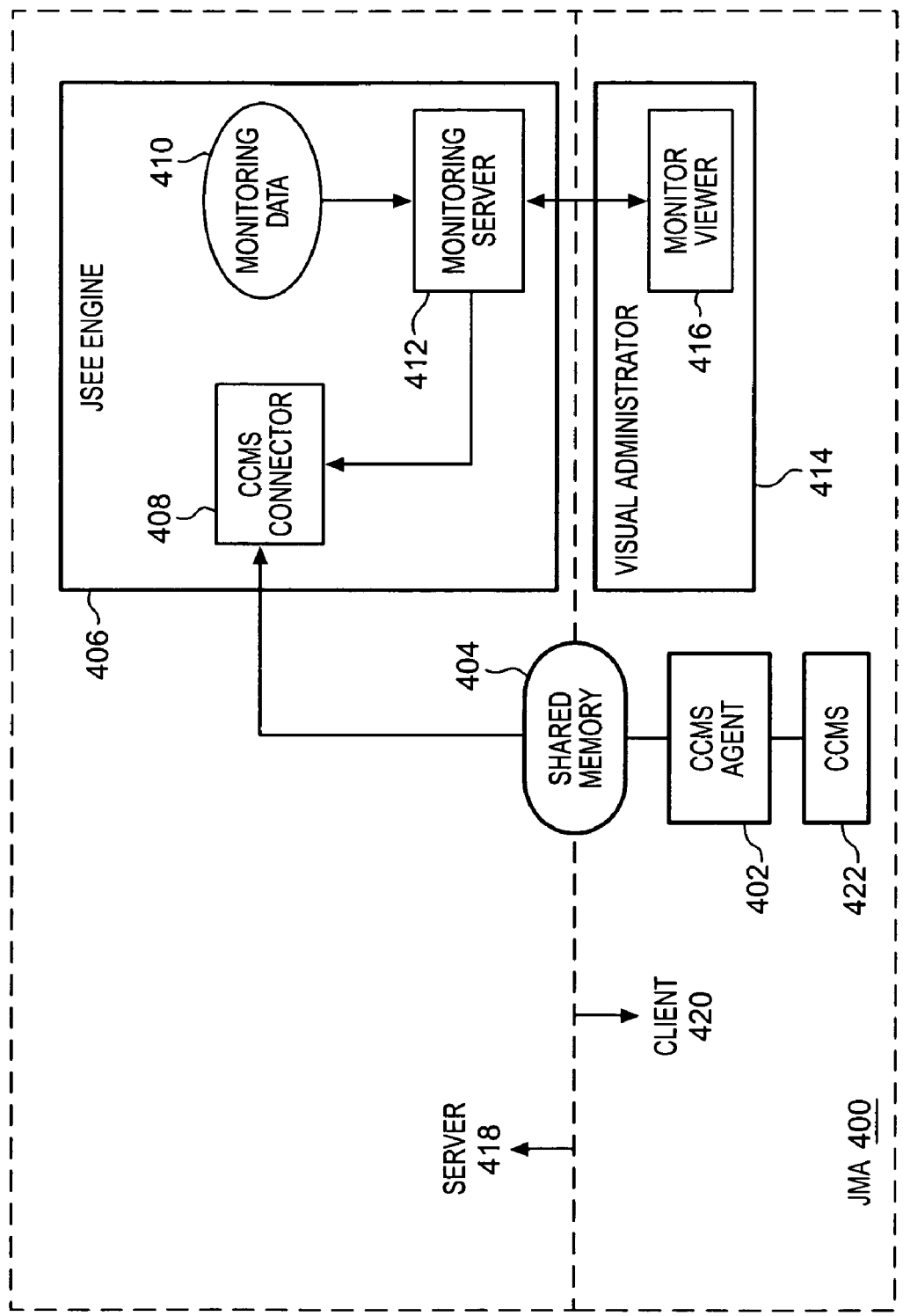
FIG. 4 is a block diagram illustrating an embodiment of Java monitoring architecture.

FIG. 4 illustrates one embodiment of the invention. The illustrated embodiment of the Java monitoring architecture (JMA) 400 is based on Java Management Extensions compliant monitoring architecture (JMX architecture) for administration and management of the Java 2 Platform, Enterprise Edition ("J2EE") engine 406. According to one embodiment, the administration and management of the resources associated with the J2EE engine 406 may include monitoring of various system resources, including Java resources and other arbitrary resources and resources associated with the J2EE engine 406, including kernel, services, interfaces, libraries for each of the dispatchers and servers, network connections, memory consumption, threads, classloaders, database connections, database transactions, HyperText Transport Protocol ("HTTP") cache, Java Messaging Service ("JMS") queries and topics, sessions, and the like, using a monitoring service, such as the monitoring service 412.

According to one embodiment, various services of the monitoring service 412 may include monitoring of the resources, gathering of the monitoring data relating to the monitored resources, and maintaining of the monitoring data 410. The maintaining of the monitoring data 410 may include maintaining history and providing alerts when various resources, such as parameters, applications, or components reach a critical state, and such features may be enabled or disabled depending on when and whether the J2EE engine 406 is connected to the CCMS 422 via CCMS agent 402 with shared memory 404, directly or indirectly, coupled with the CCMS agent 402 and CCMS connector 408.

According to one embodiment, the JMA 400 may include the monitoring service 412 and one or more JMX-based monitor servers (JMX monitors). The monitoring service 412 may help establish a connection between a JMX monitor and the various components of the JMA 400. According to one embodiment, JMX monitors may reside and work on separate or remote Java virtual machines (JVMs) to collect data from cluster elements, and report information and statistics regarding the cluster nodes and their components to, for example, the visual administrator 414 having a monitor viewer 416, and/or to the CCMS 422 via the CCMS agent 402, and to various other third party tools. The CCMS 422, the visual administrator 414, and other third party tools may reside generally on the client side 420, while other components, as illustrated, may reside on the server side 418. In one embodiment of the invention, the management techniques described herein are used to manage resources within a "cluster" of server nodes. An exemplary cluster architecture is described below with respect to FIGS. 10-11. However, the underlying principles of the invention are not limited to any particular application server architecture.

Figure 5:
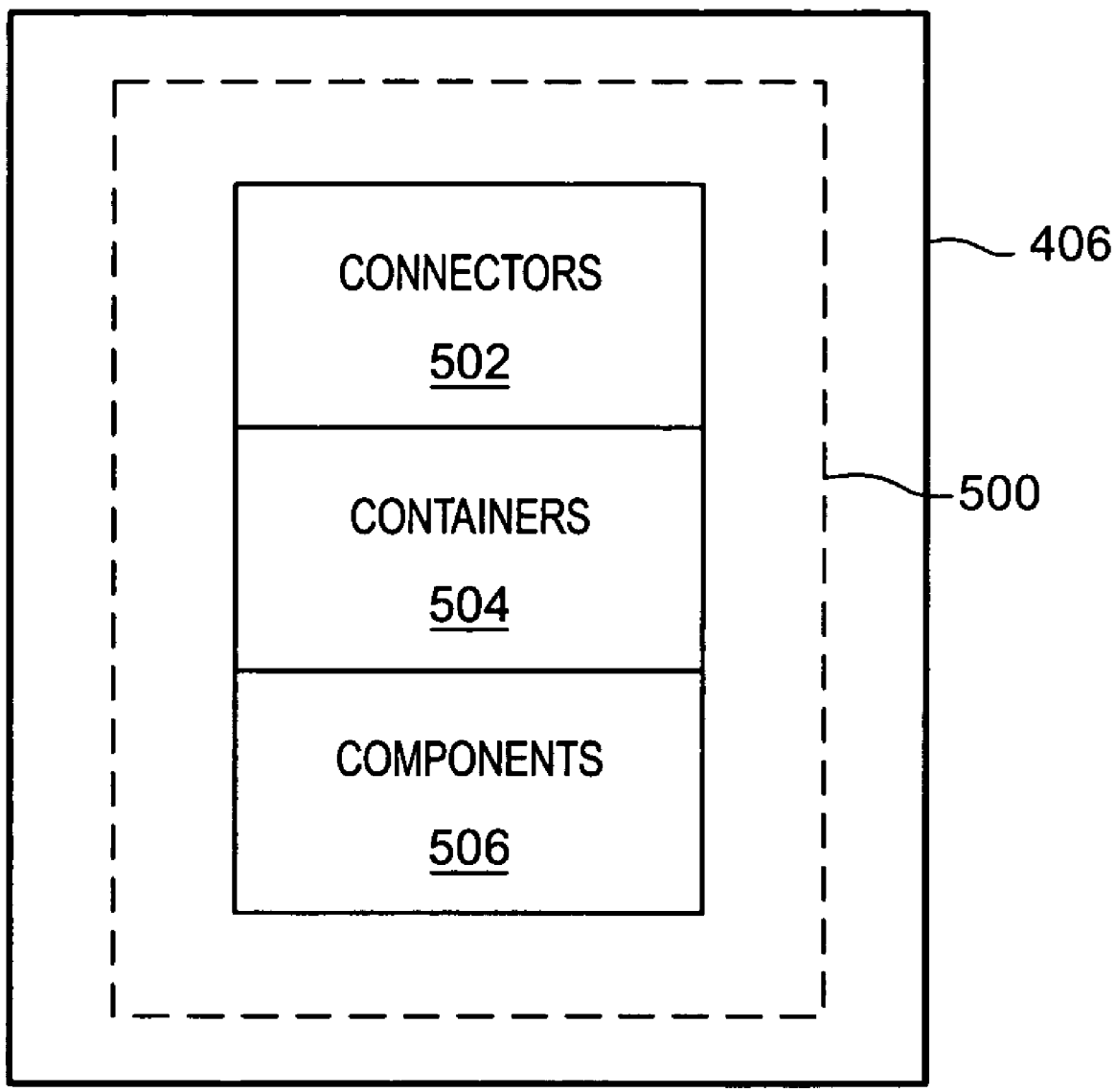
FIG. 5 is a block diagram illustrating an embodiment of a Java 2 Platform, Enterprise Edition engine model.

FIG. 5 is a block diagram generally illustrating an embodiment of an application server model comprising connectors 502, containers 504, and components 506. In one embodiment the application server model is based on the J2EE standard. The connectors 502, for example, may include adapters (e.g., portable adapters), to provide portable services from other applications along with the existing services of the J2EE engine 406. Once again, however, the underlying principles of the invention are not limited to the J2EE standard.

The components 506 may be used to implement various functionalities of the applications of the J2EE engine 406. The containers 504 may be used for execution of the components 506, and may be further used as an interface between the components 506 and the connectors 502.

Figure 6:
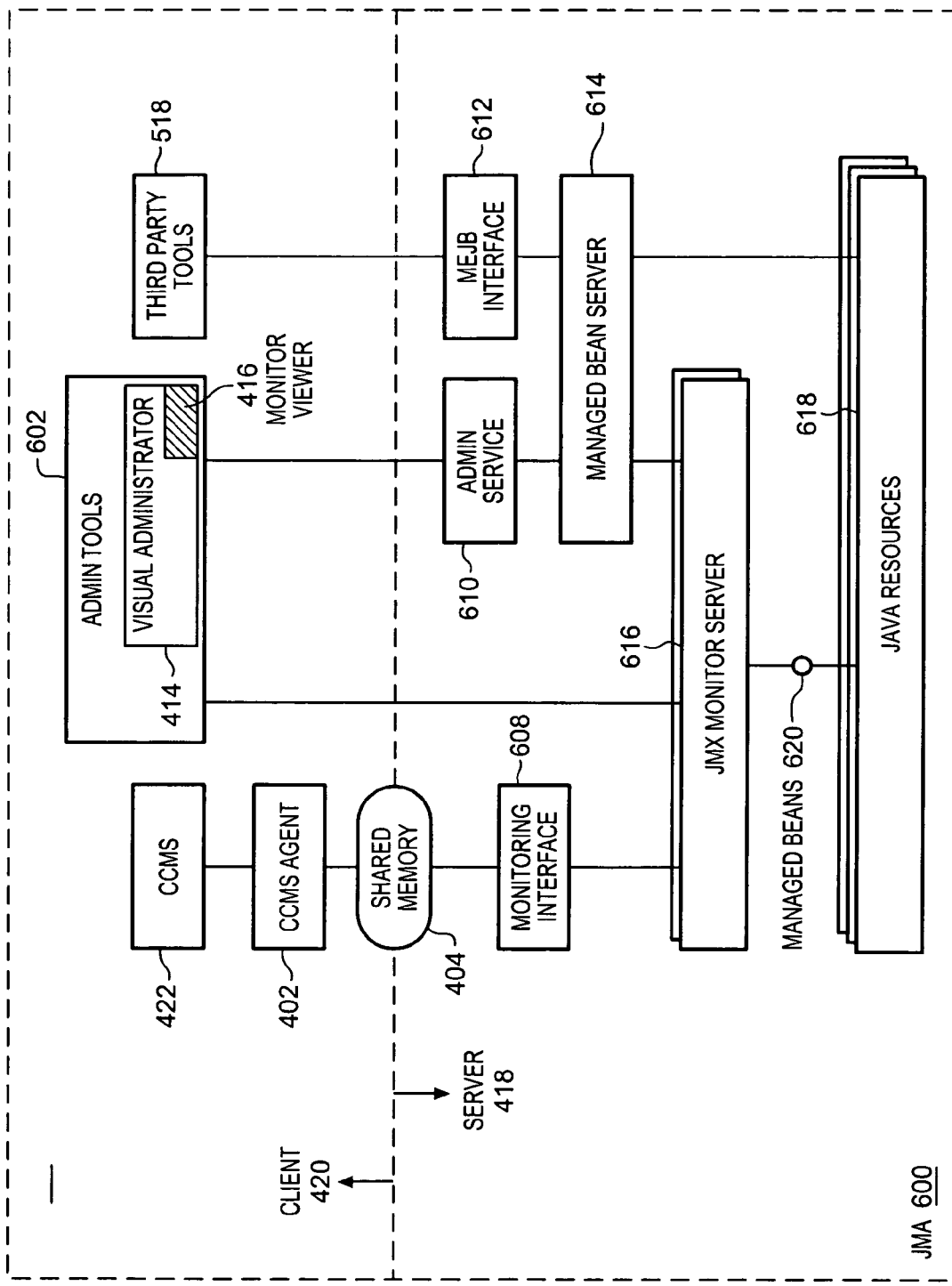
FIG. 6 is a block diagram illustrating an embodiment of Java monitoring architecture.

FIG. 6 is a block diagram illustrating an embodiment of Java monitoring architecture. Monitoring typically refers to a periodic oversight of a process, or the implementation of an activity, which seeks to establish the extent to which input deliveries, work schedules, other required actions and targeted outputs are proceeding according to plan, so that timely action can be taken to correct the deficiencies detected. According to one embodiment, Java monitoring system or architecture ("JMA") 600 and its various components may be used to provide monitoring of resources and the semantics of data to ensure oversight and may provide information for correct analysis of the monitored resources 618. Furthermore, according to one embodiment, JMA 600 may ensure first level of data processing, analysis, evaluating, and transporting of the data to various customer-level analysis modules and systems (e.g., a monitoring tree, CCMS systems, and third-party plug-ins).

According to one embodiment, the Java Management Extensions (JMX)-based JMA 600 may be used to provide monitoring of the Java 2 Platform, Enterprise Edition (J2EE) engine, such as the J2EE Engine 406 of FIG. 4, and its Java resources (resources) 618 including various managers, services, components, such as a kernel, interfaces, libraries for each of the dispatchers and servers, network connections, memory consumption, threads, classloaders, database connections, database transactions, HyperText Transport Protocol ("HTTP") cache, Java Messaging Service ("JMS") queues and topics, and sessions.

According to one embodiment, the JMX may serve as a protocol used inside the J2EE engine 406 for the purposes of administering, managing, and monitoring of the Java resources 618. According to one embodiment, for Java monitoring, the JMA 600 may employ a management interface, such as the Managed Bean server ("bean server") 614 which registers and manages Managed Beans ("beans") 620. The bean server 614 may include a container for the beans 620 to provide them access to various types of management applications which use the beans 620 to manage the Java resources 618.

According to one embodiment, to provide managed beans 620 to various management applications and to use the bean server 614 for such purposes, the management applications may be made available via the distributed services level of the JMX architecture (e.g., distributed services level 310 of FIG. 3). For example, well-known protocols (e.g., HTTP) may be used with an appropriate "protocol adapter" that may translate operations into representations in a given protocol, or one or more "connectors" may be used to provide the same interface to the management applications as the bean server 614 using a proprietary protocol.

Protocol adapters generally listen for incoming messages that are constructed in a particular protocol (e.g., such as like HTTP or SNMP). As such, protocol adapters are comprised of only one component that resides in the MBean server. For example, clients equipped with Web browsers may communicate with the bean server 614 via an HTTP protocol adapter.

By contrast, connectors are generally comprised of two components, one which resides on the bean server 614 and the other which resides on the client-side applications. Thus, connectors hide the underlying protocol being used to contact the MBean server (i.e., the entire process happens between the connector's two components). Throughout this detailed description, it is assumed that communication with an MBean server occurs via a protocol adapter and/or connector of that MBean server, notwithstanding the fact that the protocol adapter/connector may not be explicitly described or illustrated.

As mentioned above, the JMA 600 may be logically divided into a distributed services level 310, an agent level 320, and an instrumentation level 330. The instrumentation level 330 may consist the managed Java resources and their beans 620, the agent level 320 may include the bean server 614, and the distributed services level 310 may include various management applications, adaptors, and connectors.

According to one embodiment, various resources 618 of the J2EE engine 406 may be at the agent level 320 and may be included as an external library. A JMX service module (e.g., jmx_service) may provide some of the functionality from the distributed services level 310, and may create an instance of the bean server 614 on each of the nodes in one or more clusters and provide local and cluster connections to all of them. A user or client of the JMX architecture may work with the bean server 614 transparently, e.g., from the user's perspective there may be only one bean sever 614 having beans 620 registered clusterwide. In addition, to receive JMX notifications clusterwide, another service module (e.g., jmx_notification service), coupled with the JMX service, may be employed.

The bean server 614 may include a registry of beans 620. and may serve as a single entry point for calling beans 620 in a uniform fashion from management applications to monitor the resources 618, and collect or gather the monitoring data regarding and associated with the monitored resources 618. According to one embodiment, the bean server 614 may reside at a particular Java virtual machine (JVM) and may call the registered beans 620 from the same JVM or other JVMs. According to one embodiment, the bean server 614 may not be limited to one bean server 614 and may include multiple managed bean servers. According to one embodiment, the JMX monitor 616 may also reside at the same JVM along with the bean server 614 and its corresponding registered beans 620 or, according to another embodiment, the JMX monitor 616 may reside at other one or more JVMs that may be remotely located. The JMX monitor 616 may not be limited to one JMX monitor server and may include multiple JMX monitor servers.

The JVM may include one or more agents having a Java monitoring interface (monitoring interface) 608, JMX monitor 616, bean server 614, beans 620, other agent services, and one or more connectors or protocol adaptors. Stated differently, the JMX monitor 616, the monitoring interface 608, the bean server 614, and the beans 620 may be hosted by the same JVM or a different JVM located, locally or remotely, as part of the JMX architecture and JMA 600.

A typical management application may run on its own JVM along with a remote mechanism or access required for such purposes. The remote mechanism may be accomplished either by one or more connectors or protocol adaptors.

In one embodiment, a monitoring interface 608 performs protocol translation functions to couple the JMX monitor 616 and other components and modules of the JMA 600 to an external monitoring system such as the CCSM 422. As mentioned above, CCMS is a well know central management architecture developed by SAP AG. BY translating between the CCMS-based protocol and JMS-based protocols, the monitoring interface 608 effectively links the two systems. As a result, monitoring data collected from resources by MBeans 620 is accessible from within the CCMS system (e.g., via a CCMS-enabled client), and vice-versa. In one embodiment, a shared memory 404 is provided to implement the interface. For example, monitoring information translated by the monitoring interface 608 may be stored within the shared memory 404. A CCMS agent 402 may then read the information from the shared memory and forward the information to the CCMS system 422. In one embodiment, the agent 402 reads from the shared memory 402 periodically (e.g., based on preset time intervals). However, the agent 402 may also read from the shared memory 404 dynamically (e.g., in response to a user request).

According to one embodiment, the kernel (e.g., operating system) and server components (e.g., libraries, interfaces, and services) of the J2EE Engine 406 may be instrumented and monitored using the beans 620 registered with the bean server 614 and using the JMX monitor 616. For example, the beans 620, registered with the bean server 614, may be used to collect the monitoring data associated with the resources 618 which may then be collected from these beans 620 by one or more JMX monitors 616. The monitoring data may then be made available to the CCMS 422 via the monitoring interface 608 (as described above).

The JMA 600 may also include administrative services interface (services interface) 610 to link, for example, the JMX monitor 616 and the bean server 614 of the to the one or more administrative tools 602. The administrative tools 602 may include a visual administrator 414 having a monitor viewer 416. According to one embodiment, the collected monitoring data may be sent to various local and/or remote destinations on the client-side 412 of the JMA 600. For example, on the client-side 412, the data may be sent to the visual administrator 414, the CCMS 422, or various other third party tools 604 including, for example, a file system. The monitoring data may be received by the third party tools 604 from the bean server 614 via a Managed Enterprise JavaBeans ("MEJB") interface 612.

According to one embodiment, the overhead from using the visual administrator 414 may be reduced by using a Graphical User Interface ("GUI") tool and displaying selective data. The GUI tool may be included in one of the administrative tools 602 and/or third party tools 604. Furthermore, the monitoring data may be reported and organized according to and by its destination, such as the CCMS 422, the administrative tools 602, and the third party tools 604.

According to one embodiment, the following two logical types of beans 620 may be registered: (1) standard beans and (2) specific beans. Standard beans may provide standard functionality such as start/stop the associated resource, get/set properties of the associated resource, etc. Standard beans may be registered by default for all deployed components (e.g., kernel, libraries, interfaces, and services). Specific beans may provide component-specific functionalities that may vary from one component to another. To have the specific beans, a component may register an object that may implement a specific interface to list the processes available for its management and to extend the management interface (e.g., com.company.engine.frame.state. ManagementInterface).

According to one embodiment, for a kernel, a standard bean may be registered with each manager having a specific bean. A prerequisite for this may be to return a non-null value in a method (e.g., getManagementInterface()) from the manager interface. For libraries and interfaces, only standard beans may be registered. For services, except for the already registered standard beans, each of the services may register specific beans, and implementation of the management interface may also cause a specific bean to be registered for that particular service.

The MEJB interface 612 may be used to couple the JMX monitor 616 with the bean server 614 and the third party tools 604. The MEJB interface 612 may be a remote interface of the bean server 614 (e.g., bean server interface). According to one embodiment, the MEJB interface 612 may be implemented on top of the bean server 614. The MEJB interface 612 may forward its MEJB call to the bean server 614, and the bean server 614 may forward its MEJB call to the beans 620.

According to one embodiment, MEJB may include software component of the J2EE Engine 406 to provide a relatively pure Java environment for developing and running distributed applications. MEJB may be written as software modules containing the business logic of the application. Furthermore, MEJB may reside in and may be executed in a runtime environment (e.g., MEJB container), which may provide a number of common interfaces and service to the MEJB. The common interfaces and services may include security and transaction support. MEJB may include the following three types of beans: (1) session beans to perform processing; (2) entity beans to represent data, which can be a row, a column, or a table in a database, and (3) message driven beans that are generated to process Java messaging service (JMS) messages.

According to one embodiment, the MEJB interface 612 may provide future scalability and allow multiple user interfaces to be used, such as a Web browser and a Java application may be used to access MEJBs, or one may be switched from the other at a later time. Servlets, JSPs, and regular Java applications may be used in lieu of (or in addition to) the MEJBs.

Figure 7:
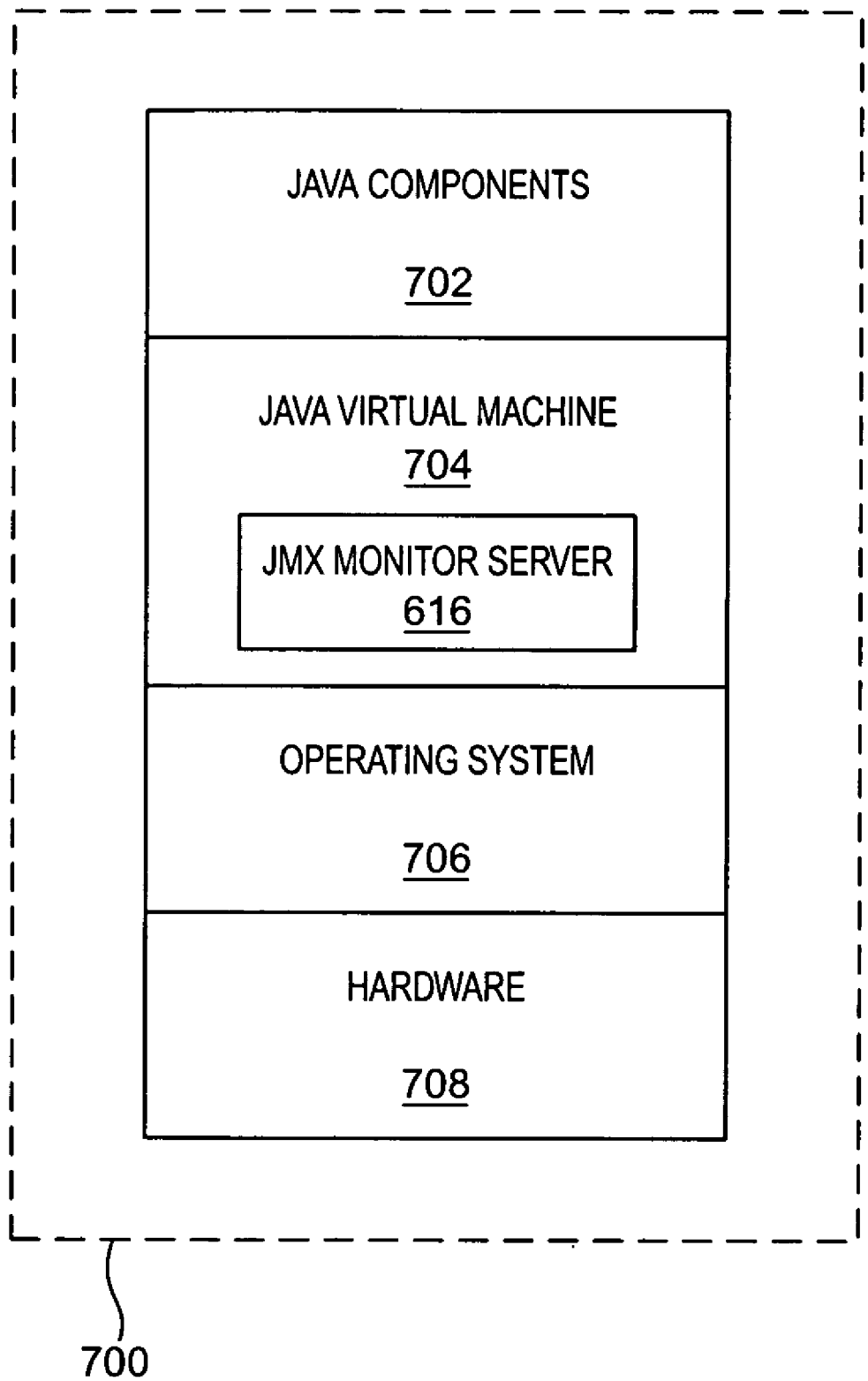
FIG. 7 is a block diagram illustrating an embodiment of a Java virtual machine environment.

FIG. 7 illustrates an embodiment of a Java virtual machine within which elements of the invention are employed. As illustrated, the Java virtual machine ("JVM") environment 700 may include various Java components 702 including Java software components, modules and programs, such as Java applications and applets. The Java components 702 may be processed via a Java virtual machine ("JVM") 704. The processing of the Java components 702 may include processing the Java components 702 from platform-independent byte-code to platform-specific native code at the JVM 704. Typically, a Java application may refer to a standalone program running outside a Web browser, while a Java applet may refer to a program running inside and by a Java-based Web browser.

According to one embodiment, various components or modules of the JMA 600 illustrated in FIG. 6 may be implemented or run using the JVM 704. For example, a Java Management Extensions-based monitor server (JMX monitor) 616 may be run using the JVM 704. The JMX monitor 616 may be run in the following two modes: (1) via the JVM 704 as a server node or standalone node of the Java 2 Platform, Enterprise Edition (J2EE) engine (e.g., J2EE engine 406 of FIG. 4) or (2) via a separate JVM, other than the JVM 704, as a separate operating system process. According to one embodiment, running the JMX monitor 616 using a separate JVM may provide an automatic startup or configuration, and may be preferred for certain uses, while the option of using the JVM 704 may provide a separate console and may be used for, for example, configuration testing. The JVM environment 700 may further include an operating system 706 and system hardware 708 where the Java components 702 may be executed.

Figure 8:
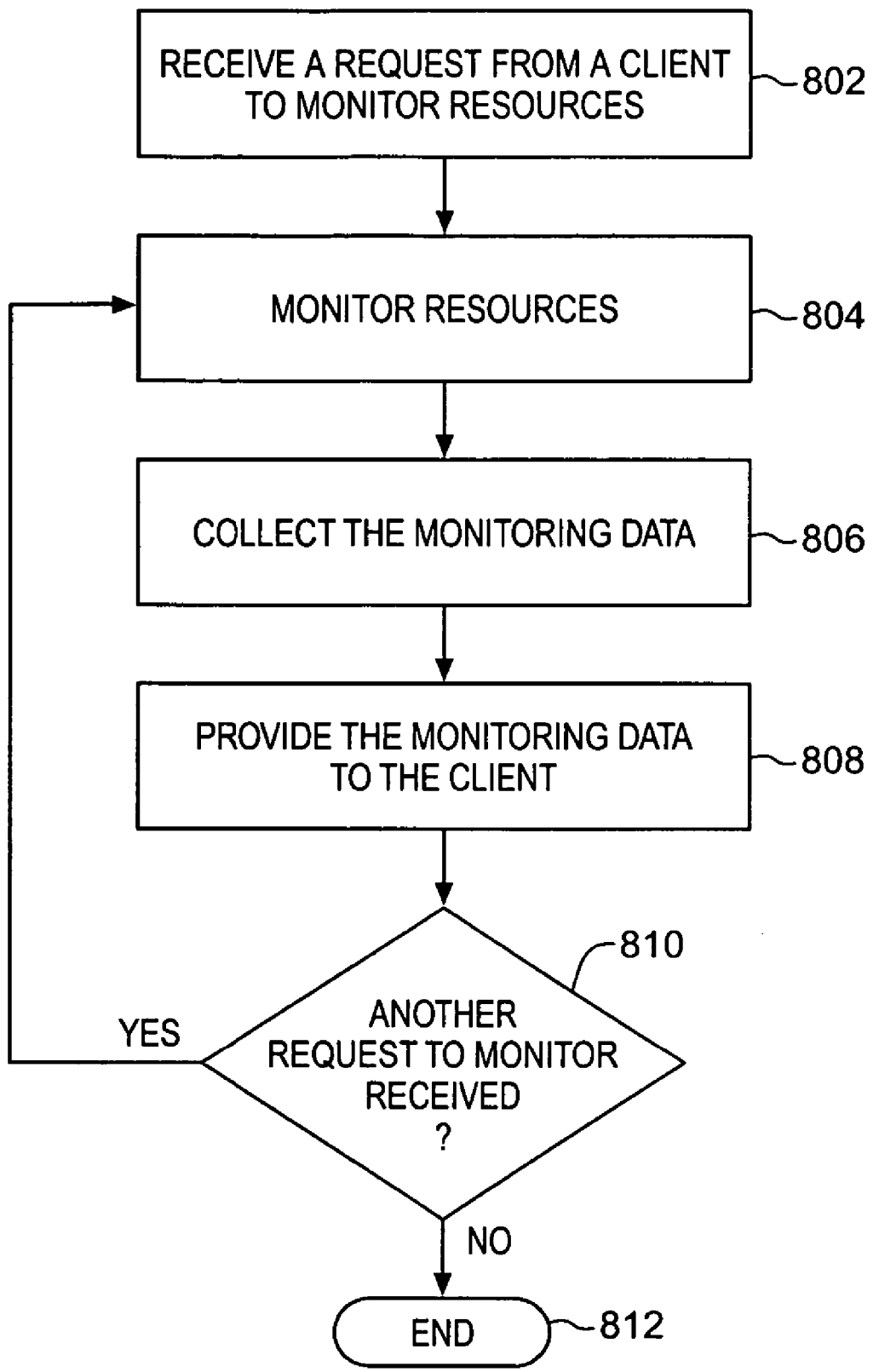
FIG. 8 is a block diagram illustrating an embodiment of a process for Java monitoring.

FIG. 8 is a flow diagram illustrating an embodiment of a process for Java monitoring. First, according to one embodiment, a request (or command) may be received from a client to monitor various specified system resources at processing block 802. The client-side, as described with reference to FIGS. 4 and 6, may include various terminals from which a user or an administrator or a system may request the monitoring system to monitor the resources. For example, the request for monitoring the resources may come from a CCMS system, a visual administrator 414 and/or other third party client side applications or tools 518.

According to one embodiment, a Java monitoring system or architecture based on Java Management Extensions (JMX) environment may be used along with a JMX monitor server (JMX monitor) to monitor the resources at processing block 804. According to one embodiment, the monitoring of the resources may include monitoring of Java resources associated with the Java 2 Platform, Enterprise Edition (J2EE) engine. Although, as mentioned above, the underlying principles of the invention are not limited to any particular standard. The monitoring of the resources, according to one embodiment, may be performed by, for example, the JMX monitor and its registered Managed Beans (beans) using a Managed Beans server (bean server). According to one embodiment, the JMX may be used as a protocol within the J2EE engine for administering, managing, and monitoring of the various resources associated with the J2EE engine.

According to one embodiment, the monitoring data from the monitoring of the resources may then be collected using various bean servers and storages at processing block 806. At processing block 808, the monitoring data may then be provided to the clients at various destinations, such as the CCMS, administrative tools, and third party tools. According to one embodiment, the monitoring data received at the client destinations may then be displayed using a monitor viewer that is part of a visual administrator or a GUI-based monitor viewer. Furthermore, according to one embodiment, one of the destinations, such as a file system, may be used to store the monitoring data to be transmitted to and used by another destination later. The file system may be an independent destination or be part of the administrative tools or the third party tools.

At decision block 810, a determination is made as to whether additional requests for monitoring have been received. According to one embodiment, monitoring of the resources may be conducted in response to the requests for monitoring received from one or more clients at various destinations. According to another embodiment, continuous monitoring of the resources may be conducted and the monitoring may be terminated or paused at the occurrence of one or more factors, such as newly added resources, re-monitoring of already monitored resources, triggering of a predetermined time period, and the like. If additional requests for the monitoring are received, the monitoring of the resources may continue at processing block 804. If no more monitoring is to be performed, the monitoring of the resources may end at processing block 812.

Figure 9:
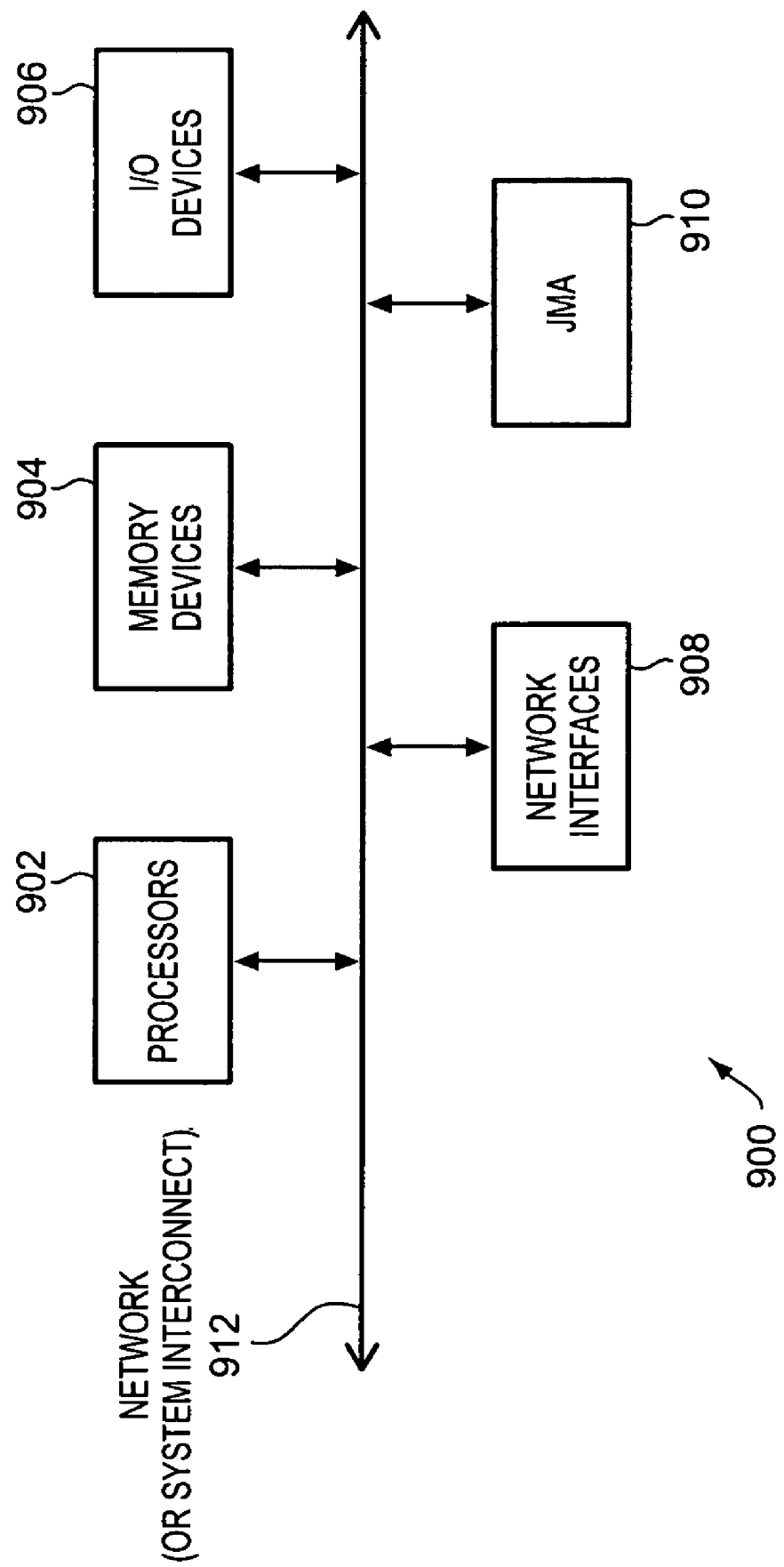
FIG. 9 is a flow diagram illustrating an embodiment of a node implementation.

FIG. 9 is a block diagram illustrating an exemplary node implementation. According to one embodiment, the node 900 may include one or more processors 902 (e.g., processors 202-206 of FIG. 2), one or more memory devices 904 (e.g., main memory 216 of FIG. 2), one or more Input/Output (I/O) devices 906 (e.g., I/O devices 230 of FIG. 2), one or more network interfaces 908, and Java monitoring system or architecture ("JMA") 910 (e.g., JMA 400 and 600 of FIGS. 4 and 6, respectively), directly or indirectly, connected together through a system interconnect or network 912. The processors 902 may include microprocessors, microcontrollers, field programmable gate arrays ("FPGAs"), application specific integrated circuits ("ASICs"), central processing units ("CPUs"), programmable logic devices ("PLDs"), and similar devices that access instructions from a system storage (e.g., memory 904), decode them, and execute those instructions by performing arithmetic and logical operations.

The JMA 910 may be used for monitoring of Java resource and components associated with, for example, a Java 2 Platform, Enterprise Edition (J2EE) engine. Components for monitoring of the Java resources using the JMA 910 may include executable content, control logic (e.g., ASIC, PLD, FPGA, etc.), firmware, or some combination thereof, in one embodiment of the present invention. In embodiments of the invention in which Java monitoring may include executable content, it may be stored in the memory device 904 and executed by the control processor 902.

Memory devices 904 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory devices 904 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 904 may store program modules, such as routines, programs, objects, images, data structures, program data, and other program modules that perform particular tasks or implement particular abstract data types that facilitate system use.

The I/O devices 906 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 912 may permit communication between the various elements of node 900. System interconnects 912 may include a wide variety of signal lines including one or more of memory buses, peripheral buses, local buses, host buses, and bridge, optical, electrical, acoustical, and other propagated signal lines.

In one embodiment of the invention, the management techniques which are the focus of this application are used to manage resources within a cluster of server nodes. An exemplary application server architecture will now be described, followed by a detailed description of the management architecture and associated processes.

Figure 10:
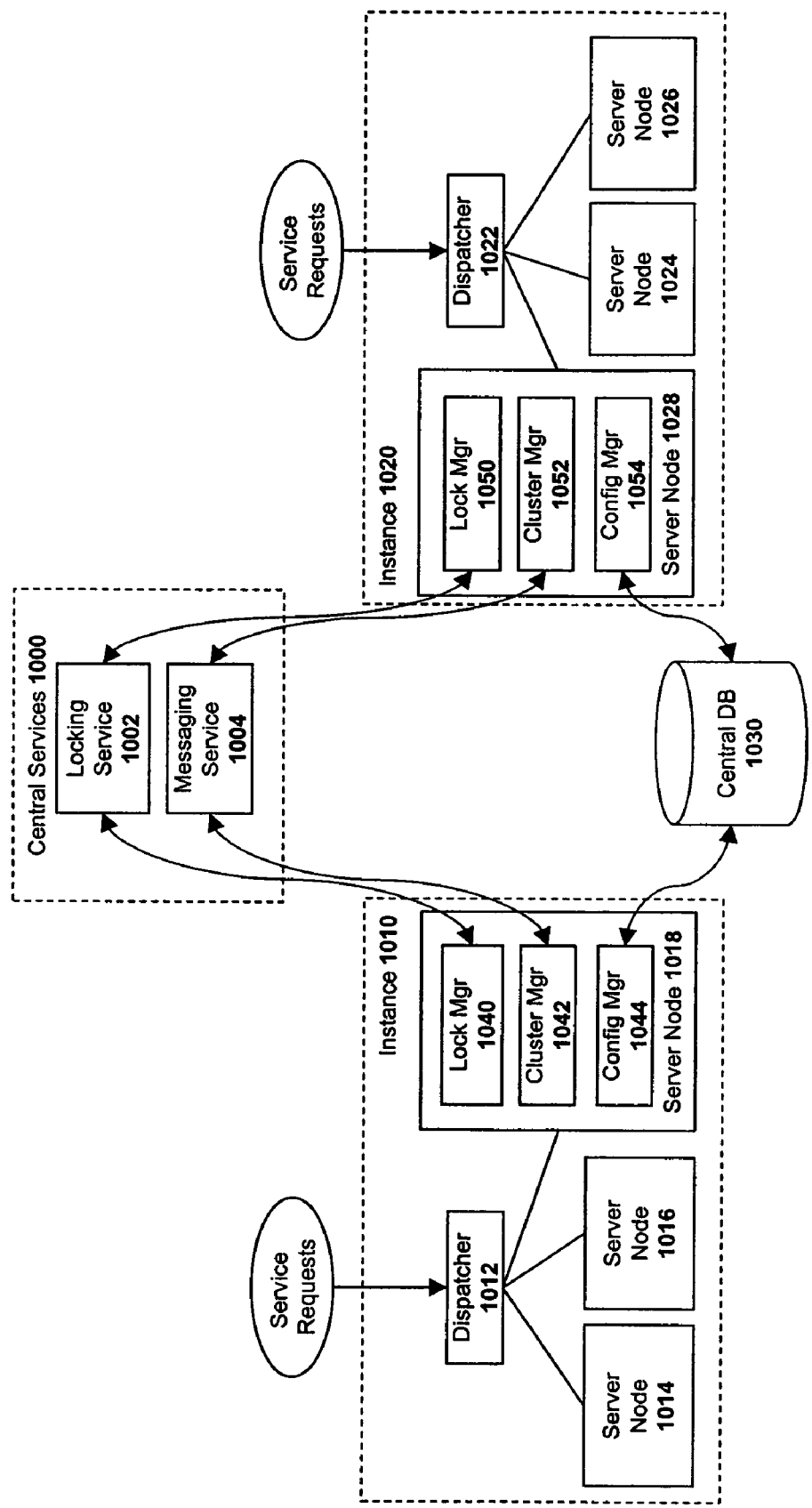
FIG. 10 is a block diagram illustrating an embodiment of an application server architecture.

An application server architecture employed in one embodiment of the invention is illustrated in FIG. 10. The architecture includes a central services "instance" 1000 and a plurality of application server "instances" 1010, 1020. As used herein, the application server instances, 1010 and 1020, each include a group of server nodes 1014, 1016, 1018 and 1024, 1026, 1028, respectively, and a dispatcher, 1012, 1022, respectively. The central services instance 1000 includes a locking service 1002 and a messaging service 1004 (described below). The combination of all of the application instances 1010, 1020 and the central services instance 1000 is referred to herein as a "cluster." Although the following description will focus solely on instance 1010 for the purpose of explanation, the same principles apply to other instances such as instance 1020.

The server nodes 1014, 1016, 1018 within instance 1010 provide the business and/or presentation logic for the network applications supported by the system. Each of the server nodes 1014, 1016, 1018 within a particular instance 1010 may be configured with a redundant set of application logic and associated data. In one embodiment, the dispatcher 1012 distributes service requests from clients to one or more of the server nodes 1014, 1016, 1018 based on the load on each of the servers. For example, in one embodiment, a dispatcher implements a round-robin policy of distributing service requests (although various alternate load balancing techniques may be employed).

In one embodiment of the invention, the server nodes 1014, 1016, 1018 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of the instances 1010, 1020 is enabled via the central services instance 1000. As illustrated in FIG. 10, the central services instance 1000 includes a messaging service 1004 and a locking service 1002. The message service 1004 allows each of the servers within each of the instances to communicate with one another via a message passing protocol. For example, messages from one server may be broadcast to all other servers within the cluster via the messaging service 1004. In addition, messages may be addressed directly to specific servers within the cluster (i.e., rather than being broadcast to all servers).

In one embodiment, the locking service 1002 disables access to (i.e., locks) certain specified portions of configuration data and/or program code stored within a central database 1030. A locking manager 1040, 1050 employed within the server nodes locks data on behalf of various system components which need to synchronize access to specific types of data and program code (e.g., such as the configuration managers 1044, 1054 illustrated in FIG. 10). As described in detail below, in one embodiment, the locking service 1002 enables a distributed caching architecture for caching copies of server/dispatcher configuration data.

In one embodiment, the messaging service 1004 and the locking service 1002 are each implemented on dedicated servers. However, the messaging service 1004 and the locking service 1002 may be implemented on a single server or across multiple servers while still complying with the underlying principles of the invention.

As illustrated in FIG. 10, each server node (e.g., 1018, 1028) includes a lock manager 1040, 1050 for communicating with the locking service 1002; a cluster manager 1042, 1052 for communicating with the messaging service 1004; and a configuration manager 1044, 1054 for communicating with a central database 1030 (e.g., to store/retrieve configuration data). Although the lock manager 1040, 1050, cluster manager 1042, 1052 and configuration manager 1044, 1054 are illustrated with respect to particular server nodes, 1018 and 1028, in FIG. 10, each of the server nodes 1014, 1016, 1024 and 1026 and/or on the dispatchers 1012, 1022 may be equipped with equivalent lock managers, cluster managers and configuration managers.

Figure 11:
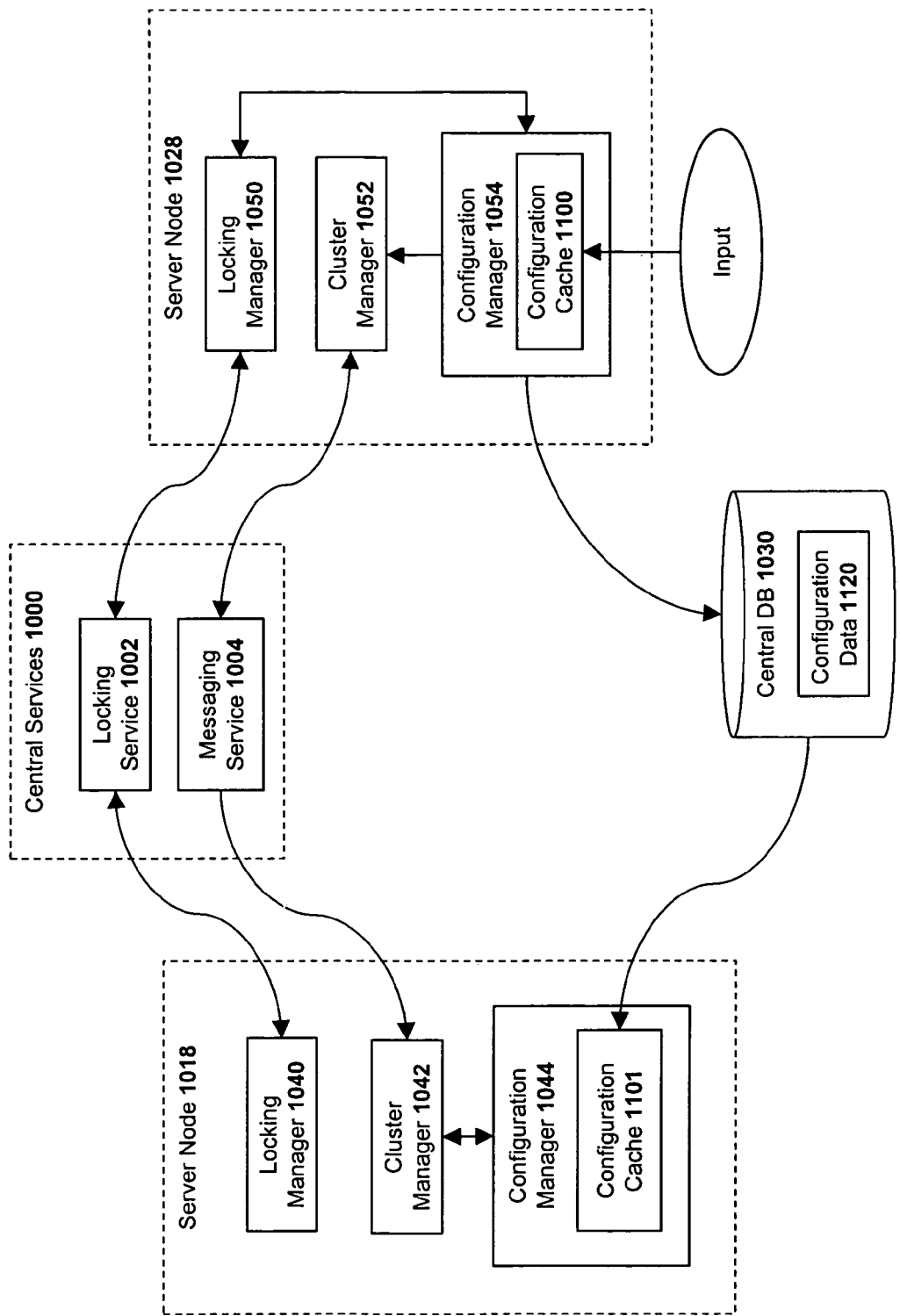
FIG. 11 is a block diagram illustrating an embodiment of an application server architecture.

Referring now to FIG. 11, in one embodiment, configuration data 1120 defining the configuration of the central services instance 1000 and/or the server nodes and dispatchers within instances 1010 and 1020, is stored within the central database 1030. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc); information related to the network management configuration for each server/dispatcher (e.g., as described below); and various other types of information related to the cluster.

In one embodiment of the invention, to improve the speed at which the servers and dispatchers access the configuration data, the configuration managers 1044, 1054 cache configuration data locally within configuration caches 1100, 1101. As such, to ensure that the configuration data within the configuration caches 1100, 1101 remains up-to-date, the configuration managers 1044, 1054 may implement cache synchronization policies.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A Java monitoring architecture (JMA), comprising:
  one or more machine-implemented monitor servers to monitor resources, collect monitoring data associated with the resources, and provide the monitoring data to one or more destinations, wherein each monitor server includes a Java Management Extensions (JMX)-based monitor server; and
  one or more managed bean servers coupled with the one or more monitor servers, each managed bean server having a registry of associated managed beans to facilitate the one or more monitor servers to monitor the resources, each managed bean server further having a container to hold the managed beans, the managed beans to access management applications to manage the resources that are being monitored, the managing of the resources including one or more of maintaining history of the resources, and providing alerts if a resource reaches a critical state such that the resource is enabled or disabled as necessitated, the resource including a parameter, an application, and a component.

2. The JMA of claim 1, wherein the one or more monitor servers are further to receive a request for the monitoring of the resources from the one or more destinations, and to monitor the resources in response to the request.

3. The JMA of claim 1, wherein the resources include Java resources associated with a Java 2 Platform, Enterprise Edition (J2EE) engine.

4. The JMA of claim 1, wherein the one or more managed bean servers are further to couple the one or more monitor servers with the one or more destinations.

5. The JMA of claim 4, wherein the one or more destinations include one or more of a computing center management system (CCMS), one or more administrative tools, and one or more third party tools.

6. The JMA of claim 5, wherein the one or more administrative tools are coupled with the one or more monitor servers and the one or more managed bean servers via an administrative service interface, the one or more administrative tools include a monitor viewer to display the monitoring data.

7. The JMA of claim 6, wherein the monitor viewer includes one or more of a visual administrator monitor viewer and a Graphical User Interface (GUI)-based monitor viewer.

8. The JMA of claim 5, wherein the one or more monitor servers are coupled with the one or more third party tools via an interface including a Managed Enterprise Java Bean interface, wherein the one or more third party tools include a file system to temporarily store the monitoring data.

9. The JMA of claim 1, further comprises a shared memory coupled with the one or more monitor servers and the CCMS, the shared memory including contents of the monitoring data and the CCMS.

10. A method, comprising:
monitoring resources via one or more monitor servers, wherein each monitor server having a Java Management Extensions (JMX)-based monitor server, the resources including Java resources, wherein the one or more monitor servers are coupled with one or more managed bean servers, each managed bean server having a registry of associated managed beans to facilitate the one or more monitor servers to monitor the resources, each managed bean server further having a container to hold the managed beans, the managed beans to access management applications to manage the resources that are being monitored, the managing of the resources including one or more of maintaining history of the resources, and providing alerts if a resource reaches a critical state such that the resource is enabled or disabled as necessitated, the resource including a parameter, an application, and a component;
collecting monitoring data associated with the resources; and
providing the monitoring data to one or more destinations.

11. The method of claim 10, further comprising:
receiving a request to monitor the resources from the one or more destinations;
receiving the monitoring data at the one or more destinations; and
displaying the monitored data using a monitor viewer at the one or more destinations.

12. The method of claim 10, wherein the monitoring data includes at least one of the following about the monitored resources: general information, statistics, predictions, and history.

13. The method of claim 10, wherein the resources include one or more of a kernel, server components, network connections, memory consumption, threads, classloaders, database connections, database transactions, HyperText Transport Protocol (HTTP) cache, Java Messaging Service (JMS) queries and topics, and sessions.

14. The method of claim 13, wherein the server components include one or more of libraries, interfaces, and services.

15. The method of claim 10, wherein the one or more monitor servers are located, locally or remotely, at one or more Java virtual machines.

16. The method of claim 11, wherein the one or more destinations include one or more of a computing center management system (CCMS), one or more administrative tools, and one or more third party tools.

17. The method of claim 16, wherein the one or more administrative tools include a monitor viewer including one or more of a visual administrator monitor viewer and a Graphical User Interface (GUI)-based monitor viewer.

18. A system, comprising:
one or more machine-implemented monitor servers to monitor resources, collect monitoring data associated with the resources, and provide the monitoring data to one or more destinations, wherein each monitor server includes a Java Management Extensions (JMX)-based monitor server;
one or more managed bean servers coupled with the one or more monitor servers, each managed bean server having a registry of associated managed beans to facilitate the one or more monitor servers to monitor the resources, each managed bean server further having a container to hold the managed beans, the managed beans to access management applications to manage the resources that are being monitored, the managing of the resources including one or more of maintaining history of the resources, and providing alerts if a resource reaches a critical state such that the resource is enabled or disabled as necessitated, the resource including a parameter, an application, and a component; and
the one or more destinations coupled with the one or more monitor servers, the one or more destinations to receive the monitoring data, and to display the monitoring data via a monitor viewer.

19. The system of claim 18, wherein the one or more monitor servers to receive a request to monitor the resources from the one or more destinations, and to monitor the resources in response to the request.

20. The system of claim 18, wherein the one or more destinations include one or more administrative tools having the monitor viewer, and one or more third party tools having a file system to temporarily store the monitoring data.

21. The system of claim 18, wherein the one or more destinations further include a computing center management system (CCMS) to originate the request, and to receive the monitoring data via a CCMS agent.

22. The system of claim 18, wherein the resources include Java resources associated with a Java 2 Platform, Enterprise Edition (J2EE) engine.

23. The system of claim 18, wherein the resources include one or more of a kernel, server components, network connections, memory consumption, threads, classloaders, database connections, database transactions, Hypertext Transport Protocol (HTTP) cache, Java Messaging Service (JMS) queries and topics, and sessions.

24. A machine-readable medium comprising instructions which, when executed, cause a machine to:

monitor resources via one or more monitor servers, wherein each monitor server having a Java Management Extensions (JMX)-based monitor server, the resources including Java resources, wherein the one or more monitor servers are coupled with one or more managed bean servers, each managed bean server having a registry of associated managed beans to facilitate the one or more monitor servers to monitor the resources, each managed bean server further having a container to hold the managed beans, the managed beans to access management applications to manage the resources that are being monitored, the managing of the resources including one or more of maintaining history of the resources, and providing alerts if a resource reaches a critical state such that the resource is enabled or disabled as necessitated, the resource including a parameter, an application, and a component;

collect monitoring data associated with the resources; and provide the monitoring data to one or more destinations.

25. The machine-readable medium of claim 24, wherein the instructions which, when executed, further cause the machine to:

receive a request to monitor the resources, the request is received from the one or more destinations;

receive the monitoring data at the one or more destinations; and display the monitored data via a monitor viewer at the one or more destinations.

26. The machine-readable medium of claim 24, wherein the monitoring data includes at least one of the following about the monitored resources: general information, statistics, predictions, and history.

27. The machine-readable medium of claim 24, wherein the resources include one or more of a kernel, server components, network connections, memory consumption, threads, classloaders, database connections, database transactions, HyperText Transport Protocol (HTTP) cache, Java Messaging Service (JMS) queries and topics, and sessions.

28. The machine-readable medium of claim 27, wherein the server components include at least one of the following: libraries, interfaces, and services.

29. The machine-readable medium of claim 24, wherein the one or more monitor servers are located, locally or remotely, at one or more Java virtual machines.

30. The machine-readable medium of claim 25, wherein the one or more destinations include one or more of a computing center management system (CCMS), one or more administrative tools, and one or more third party tools.

31. The machine-readable medium of claim 30, wherein the one or more administrative tools include a monitor viewer including one or more of a visual administrator monitor viewer and a Graphical User Interface (GUI)-based monitor viewer.

* * * * *